United States Patent [19]
Watt et al.

[11] Patent Number: 5,995,895
[45] Date of Patent: Nov. 30, 1999

[54] CONTROL OF VEHICULAR SYSTEMS IN RESPONSE TO ANTICIPATED CONDITIONS PREDICTED USING PREDETERMINED GEO-REFERENCED MAPS

[75] Inventors: John D. Watt, Davenport, Iowa; Richard E. McMillen, Sherrard, Ill.; Gerald E. Salzman, Libertyville, Ill.; Jesse H. Orsborn, Port Byron, Ill.; Stephen M. Faivre, DeKalb, Ill.; James G. Morrow, Wauwatosa; Peter J. Vogel, Whitefish Bay, both of Wis.

[73] Assignee: Case Corporation, Racine, Wis.

[21] Appl. No.: 08/892,789

[22] Filed: Jul. 15, 1997

[51] Int. Cl.[6] ............................. B60K 31/02; G06F 19/00
[52] U.S. Cl. ............................ 701/50; 701/93; 701/208; 701/213; 56/10.2 R; 56/10.2 G
[58] Field of Search ............................. 701/50, 207, 213, 701/208, 52, 53, 56, 93, 58, 68, 65; 342/357, 457, 357.06, 357.13, 357.17; 56/10.2 R, 10.2 A, 10.2 B, 10.2 C, 10.2 G, 11.1, 11.3, 11.9

[56] References Cited

U.S. PATENT DOCUMENTS

| 4,130,980 | 12/1978 | Fardal et al. | 56/10.2 |
|---|---|---|---|
| 4,171,029 | 10/1979 | Beale | 180/54 R |
| 4,233,858 | 11/1980 | Rowlett | 74/675 |

(List continued on next page.)

OTHER PUBLICATIONS

Nelson et al.; The Greenstar Precision Farming System; IEEE 1996 Postion Location and Navigation Symposium; Atlanta, GA; Apr. 22–26, 1996.

Bloom et al.; Precision Farming from Rockwell; IEEE 1996 Position Location and Navigation Symposium; Atlanta, GA; Apr. 22–26, 1996.

McLellan et al.; Who Needs a 20 CM Precision Farming System?; IEEE 1996 Position Location and Navigation Symposium; Atlanta, GA; Apr. 22–26, 1996.

Flywheels; by Richard F. Post and Stephen F. Post; Scientific American, vol. 229 No. 6 Dec. 1973.

Using DGPS to Improve Corn Production and Water Quality; by Tracy M. Blackmer and James S. Schepers; GPS World; pp. 44–52; Mar. 1996.

Development of a Field–Scale GIS Database for Spatially––Variable Nitrogen Management; by Baojin Zhang; ASAE 94–355D; 1994.

Investigation of a Feedrate Sensor for Combine Harvesters; by N.D. Klassen, S.N. Pang, R.J. Wilson and J.N. Wilson; ASAE 93–2428; 1993.

Control System for Combine Harvesters; by W.M. Kotyk, T.G. Kirk, M.D. Plassen, J.N. Wilson and En–Zen Jan; date unknown.

*Primary Examiner*—Michael J. Zanelli
*Attorney, Agent, or Firm*—Foley & Lardner

[57] ABSTRACT

A control system for controlling a vehicle system at least partly in response to an anticipated condition along the vehicle's course of travel is disclosed herein. The vehicle includes a drive train powered by an engine, and the anticipated condition may affect engine load. The control system includes a location signal generation circuit for receiving positioning signals and generating location signals therefrom, a memory circuit for storing a predetermined geo-referenced map including map data indicative of anticipated conditions along the course of travel which may affect engine load, and a control circuit. The control circuit predicts the anticipated condition using at least the location signals and the map data, generates a control signal based at least upon the anticipated condition, and applies the control signal to the vehicle system. The prediction of the anticipated condition can be calibrated using results of a comparison between a sensed actual condition and an earlier-predicted anticipated condition. Anticipated conditions include anticipated slopes, crop conditions and soil conditions. Crop conditions can be anticipated using aerial photography. The controlled vehicle systems include speed actuators, transmissions, crop processors, energy exchangers, clutches and differential locks.

59 Claims, 12 Drawing Sheets

U.S. PATENT DOCUMENTS

| | | | |
|---|---|---|---|
| 4,346,303 | 8/1982 | Bukatarevic | 290/45 |
| 4,348,855 | 9/1982 | DePauw et al. | 56/10.2 |
| 4,466,230 | 8/1984 | Osselaere et al. | 56/10.2 |
| 4,467,428 | 8/1984 | Caldwell | 364/426 |
| 4,487,002 | 12/1984 | Kruse et al. | 56/10.2 |
| 4,495,451 | 1/1985 | Barnard | 318/150 |
| 4,527,241 | 7/1985 | Sheehan et al. | 364/424 |
| 4,542,802 | 9/1985 | Garvey et al. | 180/306 |
| 4,630,704 | 12/1986 | Yamakawa et al. | 180/247 |
| 4,630,773 | 12/1986 | Ortlip | 239/1 |
| 4,704,866 | 11/1987 | Myers | 60/449 |
| 4,727,710 | 3/1988 | Kuhn | 56/10.2 |
| 4,829,304 | 5/1989 | Baird | 342/63 |
| 4,934,985 | 6/1990 | Strubbe | 460/4 |
| 5,132,906 | 7/1992 | Sol et al. | 364/426.02 |
| 5,220,876 | 6/1993 | Monson et al. | 111/130 |
| 5,315,295 | 5/1994 | Fujii | 340/936 |
| 5,317,937 | 6/1994 | Yoshizawa et al. | 477/120 |
| 5,318,475 | 6/1994 | Schrock et al. | 460/1 |
| 5,319,555 | 6/1994 | Iwaki et al. | 364/424.1 |
| 5,323,318 | 6/1994 | Hasegawa et al. | 364/424.1 |
| 5,345,154 | 9/1994 | King | 318/49 |
| 5,392,215 | 2/1995 | Morita | 364/426.04 |
| 5,396,431 | 3/1995 | Shimizu et al. | 364/449 |
| 5,455,769 | 10/1995 | Panoushek et al. | 364/424.07 |
| 5,467,271 | 11/1995 | Abel et al. | 364/420 |
| 5,485,161 | 1/1996 | Vaughn | 342/357 |
| 5,489,239 | 2/1996 | Matousek et al. | 460/62 |
| 5,505,267 | 4/1996 | Orbach et al. | 172/3 |
| 5,517,419 | 5/1996 | Lanckton et al. | 364/449 |
| 5,531,654 | 7/1996 | Ishikawa et al. | 477/120 |
| 5,546,311 | 8/1996 | Sekine | 364/449 |
| 5,557,519 | 9/1996 | Morita | 364/424.01 |
| 5,712,782 | 1/1998 | Weigelt et al. | 701/50 |
| 5,721,679 | 2/1998 | Monson | 701/50 |
| 5,832,396 | 11/1998 | Moroto et al. | 701/22 |
| 5,832,400 | 11/1998 | Takahashi et al. | 701/53 |

| DATA POINT NO. | ANTICIPATED YIELD (BU/ACRE) | ANTICIPATED MOISTURE CONTENT | LONGITUDE | LATITUDE | ALTITUDE (FEET) | ... |
|---|---|---|---|---|---|---|
| 1 | 32.0739 | 17.7 | −88.7291520 | 39.0710720 | 800.0 | |
| 2 | 56.5808 | 18.1 | −88.7291140 | 39.0710720 | 801.0 | |
| 3 | 64.1104 | 17.1 | −88.7290720 | 39.0710740 | 801.0 | |
| 4 | 96.1741 | 16.4 | −88.7290320 | 39.0710760 | 800.0 | |
| 5 | 105.247 | 15.9 | −88.7289890 | 39.0710740 | 799.0 | |
| . | . | . | . | . | . | |
| . | . | . | . | . | . | |
| . | . | . | . | . | . | |

YIELDS (BU/ACRE)

| RED | | BELOW 25 |
| ORANGE | | 25–49 |
| YELLOW | | 50–74 |
| GREEN | | 75–99 |
| CYAN | | 100–124 |
| BLUE | | 125–150 |
| VIOLET | | ABOVE 150 |

CONTROL OF VEHICULAR SYSTEMS IN RESPONSE TO ANTICIPATED CONDITIONS PREDICTED USING PREDETERMINED GEO-REFERENCED MAPS

FIELD OF THE INVENTION

The present invention relates generally to control systems for controlling vehicle systems. In particular, the present invention relates to a control system for controlling a vehicle system at least partly in response to an anticipated condition along a course of travel.

BACKGROUND OF THE INVENTION

The use of digital control systems for controlling vehicle systems on different types of vehicles is rapidly increasing. Such systems typically sense operating parameters and use the sensed parameters to generate control signals for the vehicle systems. However, such sensed parameters may become stale if delays occur before valid data can be generated. Further, typical sensors are unable to sense conditions ahead of the vehicle. Thus, it would be desirable to generate control signals based upon anticipated conditions ahead of the vehicle.

For example, speed or cruise control systems are used to control vehicle speed in automobiles, trucks, combines, tractors and other vehicles. A typical speed control system generates a closed-loop control signal based upon a difference between a target speed set by an operator using an input device and sensed vehicle speed. The control signal is applied to a speed actuator such as a throttle valve, a governor or a continuously-variable (e.g., hydrostatic) transmission which adjusts vehicle speed to minimize the difference between the speeds.

However, the accuracy of such speed control systems can suffer since they are unable to respond to varying conditions (e.g., up-hill or down-hill slopes) along a course of travel which will affect load on the vehicle's engine until after the vehicle encounters the conditions and an error in vehicle speed has occurred. For example, vehicle speed may quickly drop as the vehicle starts to climb a steep hill before a speed control system reacts and increases torque applied to the drive train. Also, such speed control systems are unable to vary vehicle speed from a target speed under conditions where vehicle speed would be varied by a skilled driver. For example, a target speed selected for steady-state travel on flat ground may be too slow for a vehicle about to ascend a hill and too fast for a vehicle about to descend a hill. Differences between a target speed and speed which would be commanded by a skilled driver may waste time and fuel, and may cause operator discomfort. It would be desirable to have a control system for more accurately controlling vehicle speed by responding to anticipated conditions (e.g., slope) along the vehicle's course of travel.

Digital control systems can also be used to control transmissions having a variable reduction ratio between the engine speed and the speed of the driven wheels. The transmissions include automatic transmissions with gears selected in response to control signals. Gear selection typically depends upon vehicle speed and the opening of a throttle valve, and gear shift points are stored in gear shift scheduling maps accessed by control circuits which generate the control signals. Multiple shift scheduling maps may be defined for use in different conditions such as a vehicle being on up-hill, flat or down-hill slopes. The transmissions further include continuously-variable transmissions (e.g., hydrostatic transmissions) including reversible-flow, variable-displacement hydraulic fluid pumps for supplying pressurized hydraulic fluid to fixed or variable-displacement hydraulic motors. The pumps are driven by power sources such as internal combustion engines, and the rate and direction of fluid flow are controlled in a closed-loop. Thus, the hydraulic motors may be operated at varying speeds and directions.

However, such transmission control systems may not select an optimal ratio under certain conditions since they are unable to respond to varying conditions along a course of travel which will affect engine load, and the selected ratio may differ from the ratio which would be selected by a skilled driver driving a vehicle having a manual transmission. For example, the selected ratio for a vehicle traveling on a flat surface may be higher or lower than the optimal ratio if the vehicle is about to ascend or descend a hill. Differences between a selected ratio and the optimal ratio or the ratio which would be selected by a skilled driver can result in an upshift or downshift occurring too early or late, increased braking, and decreased fuel economy. Thus, it would be desirable to have a system to control a transmission by responding to anticipated conditions along the course of travel.

Digital control systems can also be used to control exchanges of energy between energy storage devices and drive trains in automobiles, trucks and other vehicles powered by fuel engines, electric motors and combinations thereof. Energy exchanges are accomplished by switches or clutches which selectively couple and uncouple energy storage devices to the drive trains. The storage devices (e.g., flywheels, batteries) are charged using external power sources (e.g., electric utility lines) before the vehicles are driven, or using excess power generated by the vehicle engine during low power demand periods, or using kinetic energy recovered during deceleration or braking (e.g., regenerative braking). Energy is released from the energy storage devices during high or peak power conditions (e.g., acceleration or up-hill travel). Using energy storage devices to selectively store and release power can be advantageous. Energy can be conserved since energy normally lost during deceleration and braking can be recovered for later use, and the engine can be run at efficient operating points for longer periods. Further, less-powerful engines can be used since a portion of peak power is supplied by the energy storage devices.

However, such energy exchange control systems are unable to optimally respond to varying conditions along a course of travel which will affect load on a drive train. For example, such control systems may fully charge and then disconnect a flywheel from the drive train during steady state travel under flat conditions such that the stored energy is available to climb the next up-hill. However, if the vehicle then starts to descend a down-hill, the excess energy being generated cannot be stored since the flywheel is already charged, and the energy is wasted. Such control systems are unable to anticipate a down-hill slope and drain energy from the flywheel before starting the descent (during which the flywheel could be re-charged using excess energy). Such control systems are further unable to anticipate the end of a trip and similarly drain the flywheel energy. The energy losses may be especially problematic in electric or hybrid vehicles where the energy available from pre-charged batteries is an important limiting design factor. Thus, it would be desirable to have a control system for an energy-exchange system which improves performance by anticipating conditions along the course of travel.

Digital control systems can also be used to control vehicle systems including clutches and differential locks. Clutches may include front-wheel or four-wheel drive clutches for selectively engaging and disengaging engines from the front or rear vehicle wheels in response to control signals. Differential locks may include intra- or inter-axle differential locks for selectively locking and unlocking wheels or axles in response to control signals. The control signals may, for example, select four-wheel drive or lock a differential as a vehicle travels up-hill or down-hill.

However, clutch or differential lock control systems may not optimally respond to varying conditions along a vehicle's course of travel which will affect engine load and traction. For example, such control systems may fail to engage a clutch or lock a differential until a vehicle has already started to climb a steep hill and the wheels have started to slip. The subsequent engagement of four wheel drive or a differential lock may be too late since the wheel slipping has already decreased ground traction. Other conditions which will affect traction include the soil's moisture content, the soil surface texture (e.g., rocky, sandy, etc.) and soil compaction. It would be desirable to have such a control system responsive to these anticipated conditions along the course of travel.

A vehicle which can be equipped with various digital control systems is an agricultural harvesting vehicle (e.g., a combine or cotton harvester). Such vehicles can be equipped with control systems for controlling vehicle or engine speed, transmission ratio, and settings for various crop processors (e.g., rotor speed, concave clearance, sieve openings, and cleaning fan speed). Other agricultural vehicles (e.g., multipurpose tractors, sprayers, etc.) are also so equipped.

Agricultural harvesting vehicles typically include an engine which, when running efficiently (e.g., at or close to maximum horsepower), produces a finite amount of power which is applied to the propulsion system and the crop processors. To insure the crop processors receive sufficient power from the relatively fixed power budget to efficiently process crop with acceptable loss rates, it is desirable to control vehicle speed as a function of the power demand or load of the crop processors. Thus, vehicle speed is preferably reduced as a vehicle enters areas of a field with dense crop conditions (i.e., high crop yield or total crop mass flow) and increased as the vehicle enters areas with sparse conditions. Maximum efficiency is achieved by setting vehicle speed as high as possible while maintaining acceptable loss rates or threshing performance.

Other crop conditions may also affect the power demands of the crop processors. These conditions may include the crop type, the toughness of the crop, and the moisture content (i.e., biomass moisture) of the crop. Also, the vehicle's propulsion load is affected by ground conditions (e.g., soil moisture or surface texture).

The travel speed of a harvesting vehicle is often controlled by adjusting the hydraulic fluid flow rate of a continuously-variable hydrostatic transmission driven by the engine. Travel speed may be adjusted manually by the operator based upon sensed grain loss and other conditions detected by sensors (e.g., yield), and by the operator himself. However, efficiency of such control systems depends upon an operator's skill, and the need to make continual adjustments is tiresome for the operator.

Attempts have been made to automate control of the various settings of harvesting vehicles. For example, U.S. Pat. No. 4,130,980 describes a control system for automatically controlling the forward speed of a combine in response to feeder and separator loading and for reducing speed in proportion to grain losses exceeding predetermined limits.

However, such control systems have been relatively inefficient because the control inputs (grain loss; crop yield; total crop mass flow; moisture content) are generated too late in the control cycle. A significant time period (e.g., 5 or 10 seconds) may be required for crop to be processed (e.g., cut, gathered, threshed, separated and cleaned) before the control inputs are sensed. During this crop passage delay, the vehicle may travel a significant distance and conditions of the crop currently being cut and processed may have changed from the conditions being sensed. For example, with a processing delay of 10 seconds and a ground speed of 3 mph, sensed crop conditions will correspond to crop that was growing 44 feet rearward of the crop being cut.

The stale sensed data adversely impacts harvesting efficiency. For example, if the sensed crop was sparse but the crop currently being cut is dense, such control systems erroneously increase vehicle speed just as more power is needed to process the crop, thereby increasing grain loss and decreasing efficiency due to overloaded crop processors. By the time the increased grain loss and increased yield signals become available to the controller, conditions may have already changed. In this situation, it would have been desirable to slow the vehicle before the dense crop was cut in order to maintain a uniform feed rate. In the opposite example, if the sensed crop was dense but the crop currently being cut is sparse, such control systems erroneously decrease vehicle speed just as crop processor load is decreasing, thereby wasting time and decreasing efficiency.

Accordingly, it would be advantageous to provide an improved control system for controlling a vehicle system. The vehicle system may include a vehicle speed actuator, transmission, energy exchanger, clutch, differential lock or crop processor. It would be desirable to provide a control system for controlling a vehicle system at least partly in response to anticipated conditions of a field, road or crop along a course of travel. Further, it would be desirable to provide a control system for controlling a vehicle system in response to an anticipated condition which will affect engine load as the vehicle moves along a course of travel. It would further be desirable to provide control of various systems in an agricultural harvesting vehicle in response to anticipated conditions of crop before such conditions have been sensed.

Anticipated conditions can correspond to positions along a course of travel at which the conditions have not been detectable in real-time by vehicle-mounted sensors as is desired for certain control purposes. Conditions forward of the current position of the vehicle have not been detectable in real-time. For example, a down-hill slope starting 100 yards forward of the current vehicle position has not been detectable. Conditions for which a significant processing time is required for sensing have also not been detectable in real-time. As explained above, for example, some crop conditions such as yield and total mass flow have not been detectable in real-time because of the processing delays required for sensing. Thus, it would be desirable to provide a control system for controlling a vehicle system which can predict an anticipated condition along a course of travel before such condition is detectable by conventional sensors.

SUMMARY OF THE INVENTION

In a vehicle including a drive train powered by an engine for moving along a course of travel, an embodiment of the present invention provides a control system for controlling a vehicle system at least partly in response to an anticipated condition along the course of travel which will affect engine load. The control system includes a location signal generation circuit supported by the vehicle and configured to receive positioning signals and to generate location signals therefrom which represent the current position of the vehicle, a memory circuit for storing a predetermined geo-referenced map including spatially-variable map data indicative of anticipated conditions along the course of travel which will affect engine load, and a control circuit coupled to the location signal generation circuit, the memory circuit and the vehicle system. The control circuit is configured to predict the anticipated condition using at least the location signals and the map data, to generate a control signal based at least upon the anticipated condition to accommodate the affect on engine load, and to apply the control signal to the vehicle system. The vehicle system may include a speed actuator for setting vehicle speed in response to the control signal.

In a vehicle including a drive train powered by an engine for moving along a course of travel, another embodiment of the present invention includes a control system for controlling a vehicle system at least partly in response to an anticipated condition along the course of travel which will affect engine load. The control system includes means for generating location signals which represent the current position of the vehicle, means for storing spatially-variable map data indicative of anticipated conditions along the course of travel which will affect engine load, means for predicting the anticipated condition using at least the location signals and the map data, means for generating a control signal based at least upon the anticipated condition to accommodate the affect on engine load, and means for applying the control signal to the vehicle system.

In a vehicle including a drive train powered by an engine for moving along a course of travel, another embodiment of the present invention includes a control system for controlling a transmission, clutch or differential lock at least partly in response to an anticipated condition along the course of travel. The transmission has a ratio selected in response to a control signal. The clutch is engaged and disengaged in response to a control signal. The differential is locked and unlocked in response to a control signal. The control system includes a location signal generation circuit supported by the vehicle and configured to receive positioning signals and to generate location signals therefrom which represent the current position of the vehicle, a memory circuit for storing a predetermined geo-referenced map including spatially-variable map data indicative of anticipated conditions along the course of travel, and a control circuit coupled to the location signal generation circuit, the memory circuit and the transmission, clutch or lock. The control circuit is configured to predict the anticipated condition using at least the location signals and the map data, to generate the control signal based at least upon the anticipated condition, and to apply the control signal to the transmission, clutch or lock.

In an agricultural harvesting vehicle including a drive train powered by an engine for moving along a course of travel, another embodiment of the present invention includes a control system for controlling a vehicle system at least partly in response to an anticipated condition of crop along the course of travel. The control system includes a location signal generation circuit supported by the vehicle and configured to receive positioning signals and to generate location signals therefrom which represent the current position of the vehicle, a memory circuit for storing a predetermined geo-referenced map including spatially-variable map data indicative of anticipated conditions of crop along the course of travel, and a control circuit coupled to the location signal generation circuit, the memory circuit and the vehicle system. The control circuit is configured to predict the anticipated condition of crop using at least the location signals and the map data, to generate a control signal based at least upon the anticipated condition of crop, and to apply the control signal to the vehicle system.

In a vehicle driven by a drive train along a course of travel, another embodiment of the present invention includes a control system for controlling an energy exchanger at least partly in response to an anticipated condition along the course of travel. The energy exchanger is configured to exchange energy between an energy storage device and the drive train. The control system includes a location signal generation circuit supported by the vehicle and configured to receive positioning signals and to generate location signals therefrom which represent the current position of the vehicle, a memory circuit for storing a predetermined geo-referenced map including spatially-variable map data indicative of anticipated conditions along the course of travel, and a control circuit coupled to the location signal generation circuit, the memory circuit and the energy exchanger. The control circuit is configured to predict the anticipated condition using at least the location signals and the map data, to generate a control signal based at least upon the anticipated condition, and to apply the control signal to the energy exchanger.

In an agricultural harvesting vehicle including a drive train powered by an engine for moving along a course of travel, another embodiment of the present invention provides a method of controlling a vehicle system at least partly in response to an anticipated condition of crop along the course of travel. The method includes the steps of: generating a geo-referenced map of the field including data indicative of anticipated conditions of crop along the course of travel by remotely sensing the field prior to harvest, digitizing and geo-referencing the sensed signals, and storing the geo-referenced and digitized signals in a memory circuit; receiving positioning signals from an external source as the vehicle travels in the field and generating location signals therefrom which represent the current position of the vehicle; predicting the anticipated condition using at least the location signals and the map data; and generating a control signal based at least upon the anticipated condition and applying the control signal to the vehicle system.

BRIEF DESCRIPTION OF THE DRAWINGS

The invention will become more fully understood from the following detailed description, taken in conjunction with the accompanying drawings, wherein like reference numerals refer to like parts, in which:

FIG. 4 also includes a marker representing the current position of a vehicle such as the vehicle shown in FIG. 1, and an arrow representing an expected course of travel;

FIG. 5 also includes a marker representing the current position of a vehicle and an arrow representing an expected course of travel;

DETAILED DESCRIPTION OF THE PREFERRED EMBODIMENTS

Figure 1:
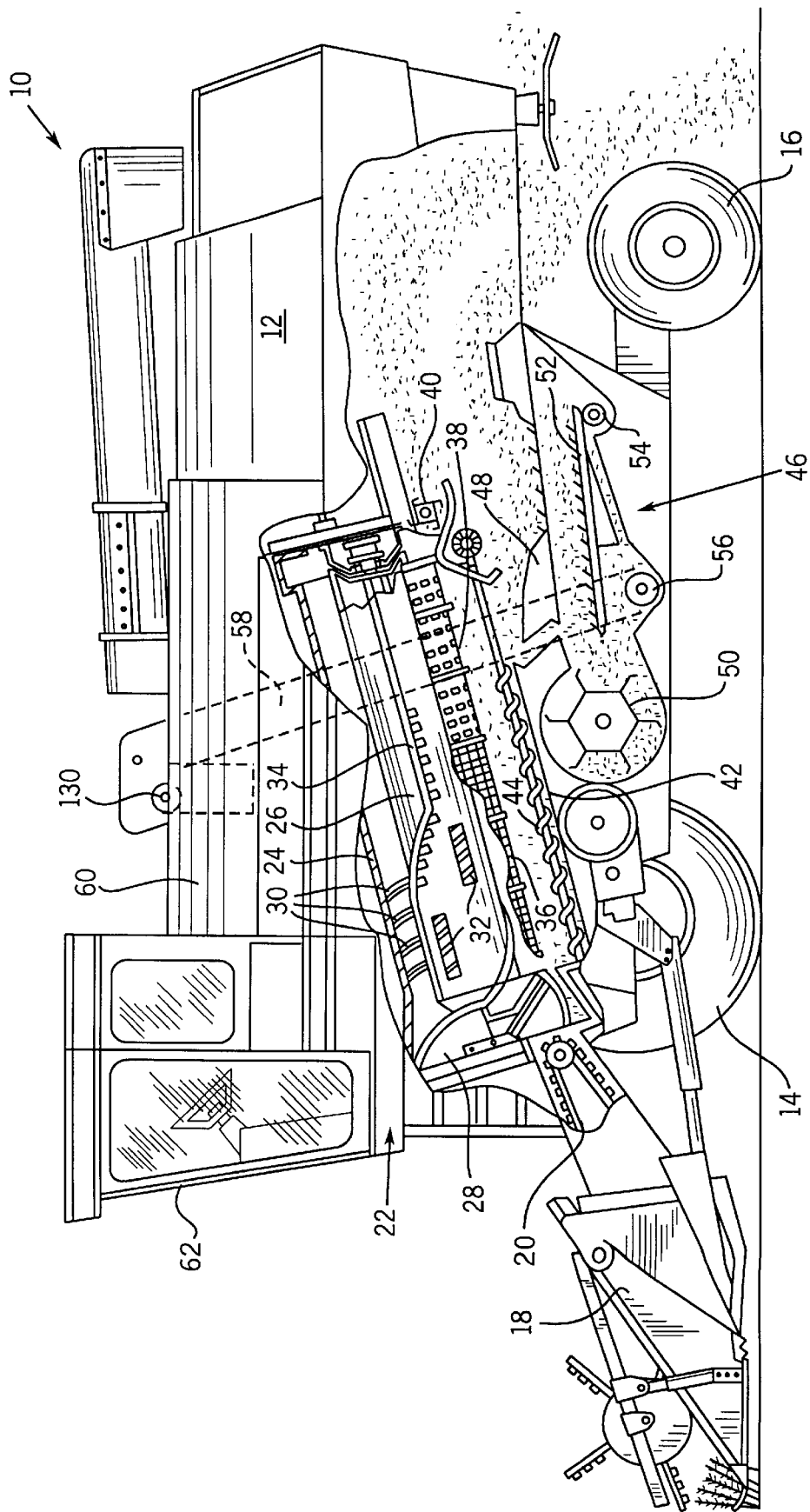
FIG. 1 illustrates an agricultural harvesting vehicle including a moveable harvesting implement and crop processors.

Referring to FIG. 1, an agricultural harvesting vehicle 10 such as a combine includes a body 12 supported by front drive wheels 14 and rear steerable wheels 16 which may be powered or unpowered. An implement 18 (e.g., header) movably coupled to the front of vehicle 10 severs the crop (e.g., wheat, corn) being harvested. The severed material is fed by a feeder 20 to an axial threshing and separating assembly 22 which includes a generally cylindrical casing 24 and a rotor 26 rotatably mounted therein. A front-mounted impeller 28 on rotor 26 drives the crop material rearwardly, and the material is impelled rearwardly in a helical direction about rotor 26 as rotor 26 rotates and cooperates with spiral vanes 30 located on an upper surface of casing 24.

As the crop material moves rearwardly, a plurality of rasp bars 32 and transport bars 34 mounted on rotor 26 cooperate with a concave 36 and a grate 38, respectively, to thresh the crop material such that most of the grain is separated and impelled outwardly through the concave and grate. Straw and other waste materials are impelled rearwardly from casing 24 by a rotary beater 40. The separated grain falls onto a grain pan 42 and is conveyed rearwardly by an auger 44 for cleaning and collection.

A cleaning and collection system 46 separates grain from the waste materials (e.g., chaff, tailings and other wastes) received from auger 44 and grate 38. System 46 includes a chaffer sieve 48, a cleaning fan 50, a grain sieve 52, a tailings auger 54 and a clean grain auger 56. Chaffer sieve 48 separates chaff from grain and tailings by reciprocating in the fore-and-aft direction. Chaff unable to pass through openings in sieve 48 is carried away by an upward and rearward airflow from cleaning fan 50. Grain and tailings passing through sieve 48 fall onto grain sieve 52 and are separated by reciprocations of the grain sieve. Tailings unable to pass through the openings in sieve 52 are moved rearwardly onto tailings auger 54 for disposal. Clean grain passing through both sieves 48 and 52 is collected by clean grain auger 56 and conveyed by a clean grain elevator 58 to a grain tank 60.

An internal-combustion engine drives a hydrostatic transmission 206 (see FIG. 7) coupled to drive wheels 14 for moving vehicle 10. The engine also provides power to the above-described crop processors. The vehicle or engine speed and crop processor settings are controlled from an operator control station located in a cab 62. In one embodiment, engine speed is controlled by a governor in response to operator inputs. The crop processor settings include the rotational speed of rotor 26 ("rotor speed"), the clearance between concave 36 and rotor 26 ("concave clearance"), the openings of chaffer sieve 48 and grain sieve 52 ("sieve openings"), and the rotational speed of cleaning fan 50 ("cleaning fan speed"). The speed of the vehicle or engine and the settings of the crop processors are controlled as described below.

Vehicle 10 is preferably similar to the 2100 Series of axial-flow combines made by Case Corp., except for the control systems used to control vehicle or engine speed, the transmission ratio and the crop processor settings. The control systems and methods disclosed herein can also be used on other conventional and axial-flow combines, on cotton harvesters such as the model 2155 and 2555 cotton harvesters made by Case Corp., and on other agricultural harvesting vehicles. Aspects of the control systems and methods disclosed herein may also be used on vehicles such as tractors, construction vehicles, trucks, busses and conventional, electric and hybrid automobiles.

Figure 2:
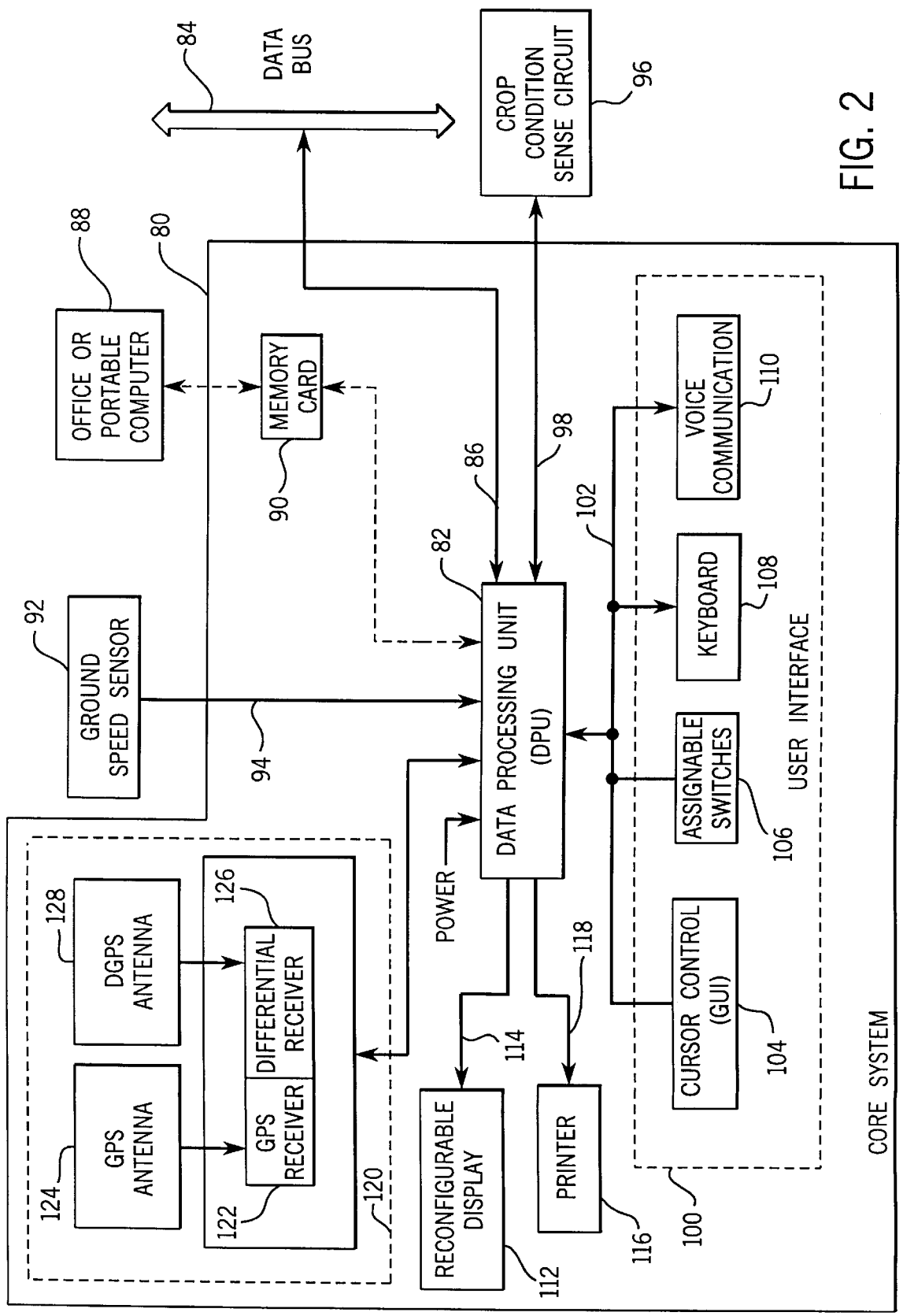
FIG. 2 is a block diagram showing site-specific farming components installed in a vehicle such as the vehicle shown in FIG. 1 wherein the components include a Global Positioning System (GPS) receiver, a memory card storing geo-referenced maps, sensors for vehicle speed and crop conditions, and a data processing unit having an interface for communicating over a vehicle data bus.

Referring to FIG. 2, vehicle 10 is equipped with a site-specific core system 80 including a data processing unit (DPU) 82 for receiving, processing and communicating site-specific data. DPU 82 includes a bus interface for communicating with vehicle control systems over a vehicle data bus 84 via lines 86. Vehicle data bus 84 preferably conforms to the SAE J-1939 standard entitled "Recommended Practice for a Serial Control and Communications Vehicle Network". DPU 82 can further communicate with external systems such as an office or portable computer 88 via a memory card 90. For example, memory card 90 is used to transfer predetermined geo-referenced maps from computer 88 to DPU 82. Preferably, memory card 90 is a Type II PCMCIA memory card made by Centennial Technologies, Inc. However, DPU 82 could communicate with external systems using floppy or hard disks, RF, infrared or RS-232/485 lines or other mediums. DPU 82 also includes interfaces for receiving sensed signals from various sensors which depend upon the application. For example, when vehicle 10 is a combine, DPU 82 receives signals representing vehicle ground speed from a sense circuit 92 via lines 94 and receives signals representing crop conditions from a sense circuit 96 via lines 98. Speed sense circuit 92 may include a sensor (e.g., magnetic pickup) configured to sense the speed of the wheels or transmission, or may include a radar device mounted to the body of vehicle 10.

Preferably, core system 80 provides site-specific and sensed data over vehicle data bus 84 to each vehicle control system requiring such data. The high integration level minimizes the duplication of hardware and software components in vehicle 10. Alternatively, the functions of core system 80 could be performed by the individual vehicle control systems. For example, in a vehicle which uses site-specific data only for controlling the speed of vehicle 10, certain of the site-specific components shown in FIG. 2 can be included within the cruise controller. The distribution of processing and control functions for the vehicle systems depends upon the specific system application. This description assumes that core system 80 provides site-specific and certain sensed data to an individual controller for each vehicle system.

DPU 82 communicates with an operator through a user interface 100 via lines 102 (e.g., RS-232/485 or keyboard interface). DPU 82 includes a digital processor (e.g., a 486DX or Pentium® microprocessor) and various types of memory including non-volatile (PROM, EEPROM or FLASH) and volatile (RAM) memory. The processor executes a program stored in non-volatile memory and the volatile memory may have a battery back-up circuit. DPU 82 could also be implemented using dedicated, specific purpose equipment or hard-wired logic circuitry. User interface 100 can include a graphical user interface (GUI) 104 providing cursor control (e.g., mouse, joystick or four-way switch with up, down, right, and left positions), assignable switches 106 (e.g., push buttons) configurable by the processor, a keyboard 108, and a voice-communication interface 110. A touch-screen display may also be used.

DPU 82 is configured to generate display signals applied to a reconfigurable display 112 (e.g., a CRT, flat screen LCD display) via lines 114. Display 112 is preferably an active-matrix LCD capable of displaying full-motion video and a number of colors under varying ambient light conditions. Display 112 can also display graphics and alpha-numeric characters. Display 112 is used, inter alia, to display the current configurations of assignable switches 106 and a map of a road or field. DPU 82, user interface 100 and display 112 are located in cab 62 to give easy access to user interface 100 and a substantially unobstructed view of display 112. Core system 80 may include a printer 116 which communicates with DPU 82 via an interface 118 (e.g., an RS-232 link).

DPU 82 also communicates with a location signal generation circuit 120 which generates location signals representing the position of vehicle 10. Circuit 120 includes a global positioning system (GPS) receiver 122 with an associated antenna 124, and a differential GPS (DGPS) receiver 126 with an associated antenna 128. A single antenna may be used in place of antennas 124 and 128. GPS receiver 122 may, for example, be made by Trimble Navigation Ltd. of California, and DGPS receiver 126 may be made by Satloc, Inc. of Arizona. GPS receiver 122 determines longitude and latitude coordinates (and altitude) of the vehicle from signals transmitted by the GPS satellite network. The accuracy of the position data is improved by applying correction signals received by DGPS receiver 126. The differential correction signals are used to correct errors present on GPS signals including the selective availability error signal added to GPS signals by the U.S. government. DGPS correction signals are transmitted by the U.S. Coast Guard and by commercial services. For example, the Omnistar DGPS system from John E. Chance & Assoc. of Texas includes a network of ten land-based differential reference stations which send correction signals to a master station which uploads signals to a satellite for broadcast throughout North America. GPS differential correction signals may also be transmitted from a local base station such as the top of a building. In a preferred embodiment, DPU 82 interfaces with the SATLOC L-Band Integrated TerraStar DGPS System via an RS-485 communication link. In another embodiment, changes in position of vehicle 10 over time can be used to determine vehicle speed.

When vehicle 10 is a combine, crop condition sense circuit 96 may, for example, sense crop yield using yield flow and moisture content sensors. The yield flow sensor may be an impact-type mass flow rate sensor attached to a steel plate struck by grain passing through clean-grain elevator 58 which measures the force of the grain. The moisture content sensor may be a capacitive-type sensor mounted on the underside of a grain-tank loading auger 130 (see FIG. 1) to measure moisture content of the grain passing near the sensor, and may include a grain temperature sensor to temperature compensate the signals. DPU 82 processes the grain flow and moisture content signals to form data representative of the respective condition, and correlates this data with location data representative of the location signals received from location signal generation circuit 120 where the crop conditions were sampled. The correlated data is stored in memory card 90 or another memory as a crop yield or moisture map. Crop condition sense circuit 96 can also sense total mass flow through the combine using a sensor attached at another location along the crop flow path. Alternatively, total crop mass flow could be indirectly sensed by sensing the load on a crop processor since such a load signal would also be representative of mass flow.

To convert the grain flow signals into yield data, the distance travelled by the combine is determined by multiplying the combine's speed by elapsed time. The speed may be based upon signals sensed by speed sensor 92, or may be determined by calculating the difference between successive position signals received from location signal generation circuit 120 and dividing by elapsed time. The yield (e.g., bu/acre) is determined by dividing the quantity of sensed grain (e.g., bu) by the area of the field harvested (e.g., acres), wherein the quantity of sensed grain is the product of the grain flow rate and time, and the area is the product of the width of cut and distance travelled.

Figures 3, 4:
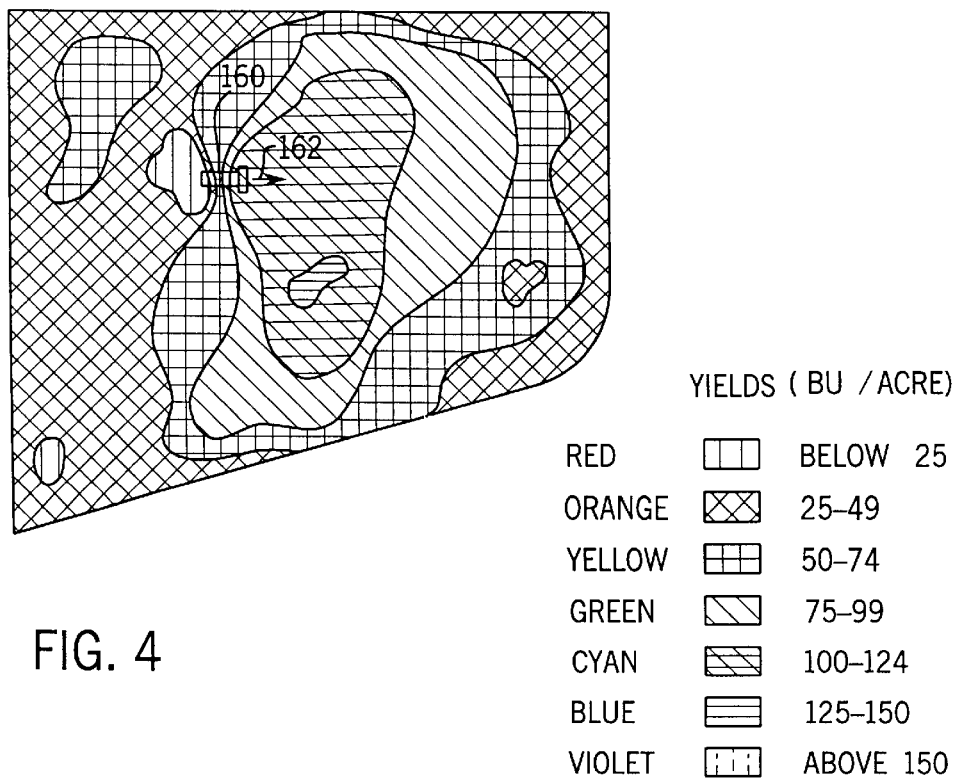
FIG. 3 represents a predetermined geo-referenced map including data indicative of anticipated yield and moisture content of a farming field stored in memory.
FIG. 4 represents a predetermined geo-referenced map of a field stored in the memory card shown in FIG. 2 which includes spatially-variable data indicative of an anticipated crop condition throughout the field.

Referring to FIG. 3, DPU 82 is provided with at least one predetermined geo-referenced map or data layer 150 via memory card 90. Map 150 includes data indicative of anticipated conditions as vehicle 10 travels through a field or road. Map 150 is preferably implemented using a geographical information system (GIS) database which can be represented by a table wherein each row represents a position at which conditions have been anticipated, and columns of information are associated with each row. For example, a map which stores anticipated condition data for 5000 positions in a field is represented by a table with 5000 rows. A database storing an anticipated yield map can be represented by a table with a row for each position in the field at which anticipated yield data has been predetermined and, for each such position, columns for anticipated yield data and the longitude and latitude coordinates of the position. Geo-referenced maps storing anticipated conditions such as moisture content, total mass flow, road locations or altitudes are represented similarly. A plurality of maps can be represented by a single table wherein additional anticipated conditions are stored in additional columns. For example, maps for anticipated yield, moisture content and altitude can be represented by a table with columns for the respective conditions as shown in FIG. 3. The GIS databases are preferably stored as DOS files in memory card 90.

FIG. 4 represents a predetermined geo-referenced map of an agricultural field including spatially-variable data indicative of an anticipated crop condition (yield) throughout the field. The map was predetermined by the process described in relation to FIG. 14, and provided to DPU 82 via memory card 90 prior to harvest. In this example, anticipated yield varies from below 25 bu/acre of corn to between 125 and 150 bu/acre. The current position of vehicle 10 is shown by a marker 160 and the expected course of travel is shown by an arrow 162. The anticipated yield along the expected course forward of vehicle 10 is between 100 and 124 bu/acre after quickly increasing from below 25 bu/acre behind vehicle 10.

FIG. 4 could also represent a predetermined geo-referenced map of an anticipated condition other than yield if the anticipated yield data was replaced by data for the other condition. For example, if the anticipated yield data was replaced by altitude data, FIG. 4 would become a topographical or relief map representing the anticipated altitude conditions throughout the field.

Figure 5:
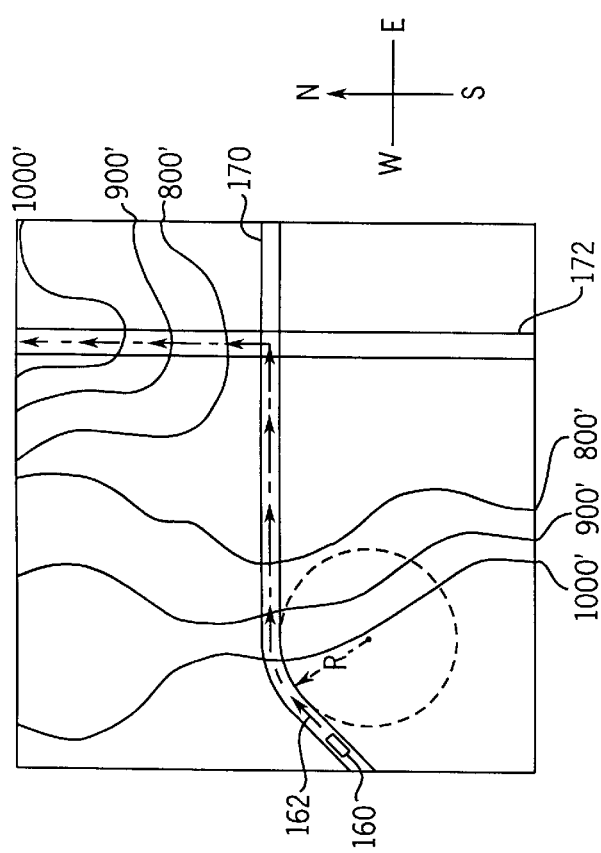
FIG. 5 represents a predetermined geo-referenced map of a road network stored in the memory card shown in FIG. 2 which includes data indicative of anticipated positions and altitudes along the road network.

FIG. 5 represents a predetermined geo-referenced map of a road network including spatially-variable data indicative of anticipated positions and altitudes along the road network. The map was also provided to DPU 82 via memory card 90. In this example, the road network includes a generally east-west road 170 and a north-south road 172. The expected course of travel, shown by arrow 162, is east along road 170 and then north along road 172 after the junction. Road 170 has a turn of radius R just forward of the current vehicle position (at marker 160). The anticipated altitudes along roads 170 and 172 vary between 1050 feet and 750 feet, decreasing from 1050 feet at the current position to 750 feet at the junction, and then increasing back to 1050 feet along road 172.

Figure 6:
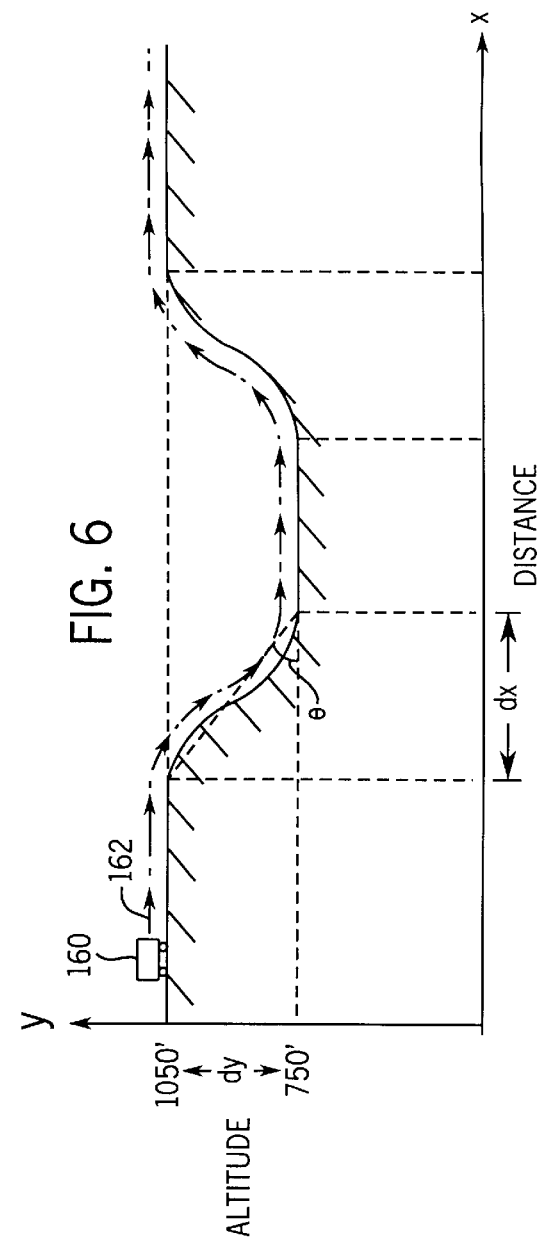
FIG. 6 represents anticipated altitudes along the expected course of travel for the vehicle shown in FIG. 5; changes in altitude represent anticipated slopes the vehicle will encounter during forward travel.

FIG. 6 represents anticipated altitudes along the expected course of travel shown in FIG. 5. Marker 160 represents the current position of vehicle 10, and arrow 162 represents the expected course. Changes in altitude represent the slopes that vehicle 10 will be anticipated to encounter. These anticipated slopes can be calculated using trigonometric relationships. As vehicle 10 travels down-hill, for example, a 1700 foot change in horizontal distance (dx) and a 300 foot decrease in altitude (dy) will give an anticipated slope θ of:

$$\Theta = \sin^{-1}\left(d\,y / (d\,x^2 + d\,y^2)^{0.5}\right) = \sin^{-1}\left(300 / (1700^2 + 300^2)^{0.5}\right)$$
$$= 10 \text{ degrees}$$

Thus, vehicle 10 is anticipated to travel at an average down-hill slope of 10 degrees over distance dx. However, as shown in FIG. 6, one portion of a hill may have a steeper slope than another portion. Anticipated slope can be calculated for all or only a portion of the hill depending upon the particular control application. The equation of a curve or line representing the altitudes along the course of travel can also be determined using standard curve-fit algorithms. Changes in altitude will affect the load on the vehicle's engine, and the running resistance that the vehicle will encounter. Using these anticipated conditions, the control systems described below can react both reactively and proactively to slopes and changes in running resistance. Other parameters affecting the running resistance (e.g., road friction) may also be used in combination with anticipated slope.

Figure 15:
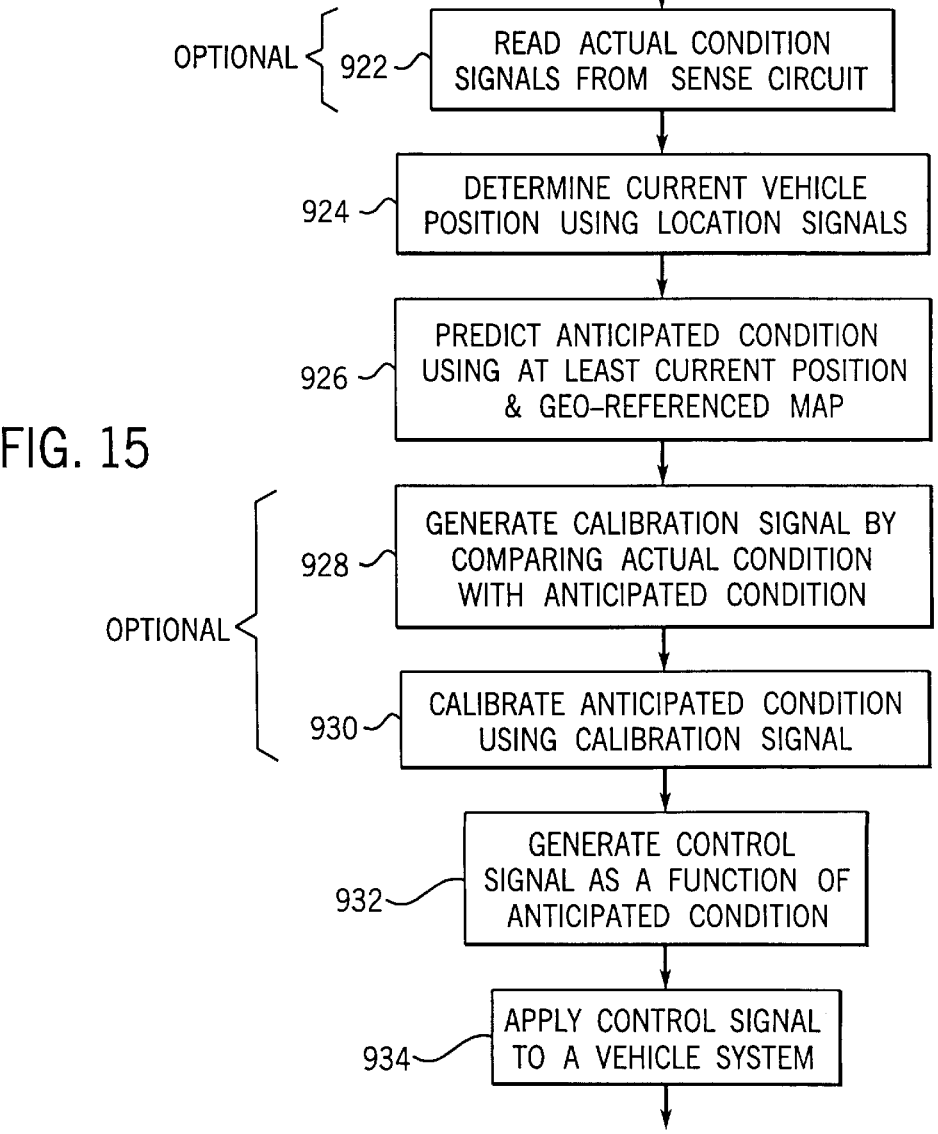
FIG. 15 is a flow chart representing the steps performed by the control circuits of the control systems illustrated in the other figures.

In FIGS. 4–6, the current position of vehicle 10 is determined by DPU 82 using location signals generated by location signal generation circuit 120 (steps 920 and 924 in FIG. 15). In situations where the anticipated condition corresponds to the current vehicle position, the current position is used to index the predetermined geo-referenced map to predict the anticipated condition at the current position (step 926 in FIG. 15). Using the current position as an index is particularly useful where the condition cannot be directly sensed in real-time by a vehicle-mounted sensor because of processing time delays. For example, as explained above, sensed yield data in a combine is typically stale due to crop processing delays. Using the current position as an index to anticipate crop yield at the current position for control purposes gives an alternative to using the stale sensed yield data.

An anticipated condition along the course of travel may also be predicted and used for control purposes for positions behind the current position of vehicle 10 (also step 926). For example, in a combine, assume 10 seconds elapse between when crop is cut and yield is measured, and that 5 seconds elapse between when the crop is cut and the crop is processed by a crop processor. If the processor settings can be optimized based upon crop yield passing through the processor, sensed yield data would be a stale control input since it corresponds to crop cut 10 seconds earlier while the crop being processed was cut only 5 seconds earlier. Anticipated yield for the crop being processed can be predicted using the yield map.

An anticipated condition may also correspond to a vehicle position along a course of travel forward of the current position. Such conditions have been undetectable by vehicle-mounted sensors. The anticipated condition is predicted using an expected position of vehicle 10 as an index to the predetermined geo-referenced map (step 926).

The first step in determining the expected vehicle position is to determine the expected course of travel forward of the current position. The expected course of travel can be determined from the current direction of travel and the assumption that vehicle 10 will continue to travel in that direction. The current direction can be determined using signals from a compass or a vector from a prior to a current position of vehicle 10. When vehicle 10 is making repetitive passes through a field, the expected course can also be determined by assuming vehicle 10 will travel parallel to the field borders or to the previous pass or row. The distance between the expected course and the borders or previous pass is the width of cut of implement 18. When vehicle 10 is on a road network or in a field, the expected course can also be determined by defining a course between the start and destination positions. An expected course can be defined by an operator using an input device to trace the course on a map of the road network or field shown on computer 88 or display 112, or by using algorithms for determining an efficient course between two positions such as that used by navigation systems with route guidance features.

Once the expected course of travel is determined, an expected vehicle position can be estimated. The expected position can be a distance forward of the current vehicle position along the expected course. The distance can be a predetermined distance, or an offset distance dependent upon vehicle speed. For example, with a vehicle speed of 3 mph and the expected position being the position where the vehicle is expected to be in 10 seconds, the offset distance is 44 feet.

The anticipated conditions at the expected vehicle positions are determined using the expected positions as indices into predetermined geo-referenced maps. FIGS. 4–6 represent predetermined geo-referenced maps provided to vehicle 10 before the vehicle travels in a field or on a road. Using these maps, the control systems in vehicle 10 can anticipate conditions along the course of travel, and use the anticipated conditions for control purposes.

Referring to FIGS. 7–13, various vehicle systems are controlled by control systems at least partly in response to anticipated conditions along the course of travel which will affect engine and drive train load. The anticipated conditions include anticipated slopes (e.g., uphills and downhills), crop conditions. (e.g., dense and sparse) and soil conditions (e.g., compaction and soil type). These control systems generate control signals based at least upon the anticipated conditions to accommodate the affect of such conditions on load. The control systems use algorithms similar to conventional control algorithms for such vehicle systems, with the anticipated conditions being additional control inputs used to adjust or override the control signals under conditions such as those described below.

Figure 7:
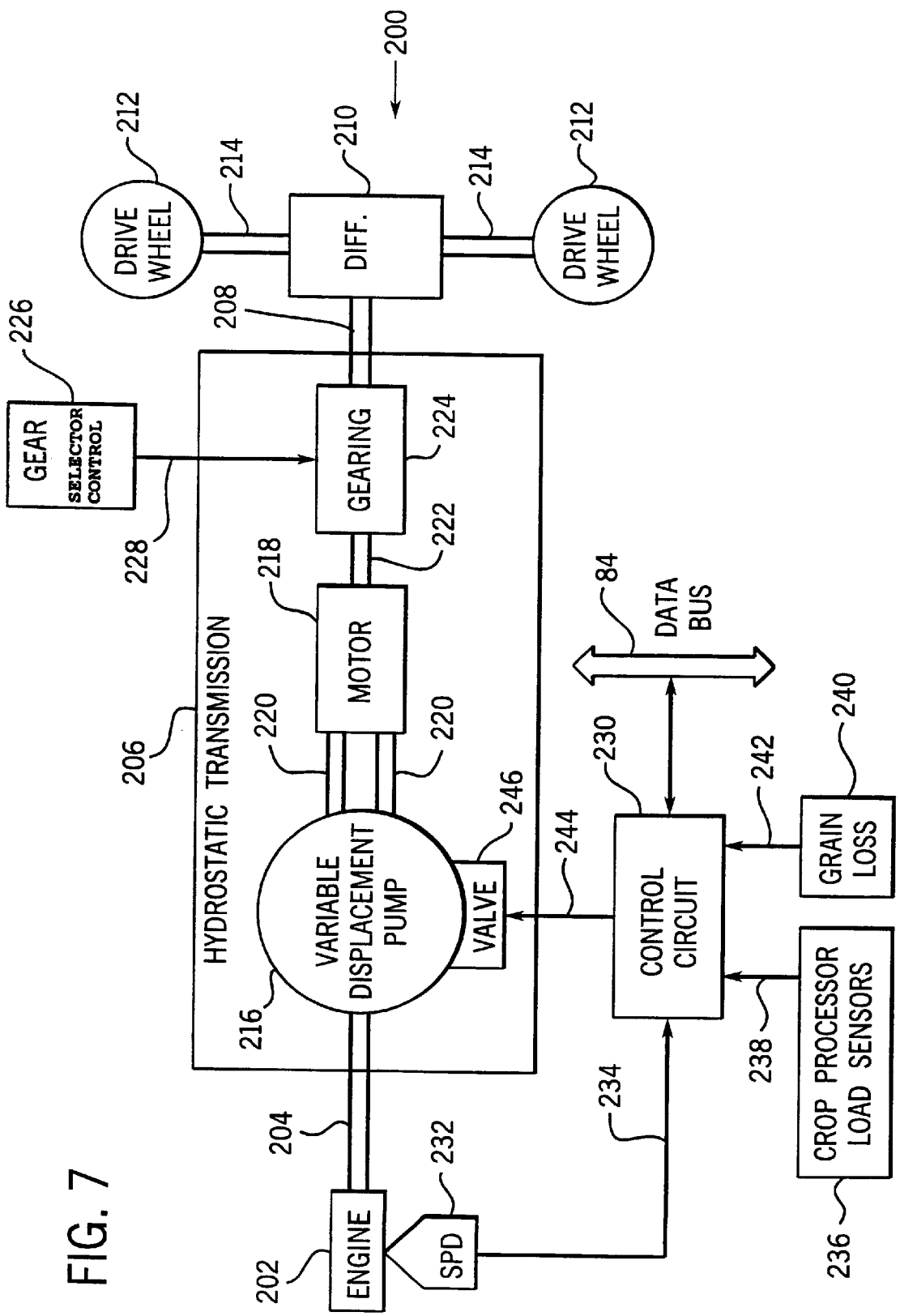
FIG. 7 is a block diagram illustrating a control system for controlling speed of a vehicle such as that in FIG. 1 wherein the control system includes a control circuit having an interface for a vehicle data bus.

FIG. 7 shows a control system for controlling the speed of vehicle 10. A drive train 200 is powered by an internal-combustion engine 202 which can be controlled by an engine speed governor (not shown). Engine 202 drives an input shaft 204 of a hydrostatic transmission 206 with a continuously-variable reduction ratio. Transmission 206 drives an output shaft 208 coupled to a differential 210 which distributes power to drive wheels 212 via axle 214. Hydrostatic transmission 206 includes a reversible-flow, variable-displacement pump 216 powered by shaft 204 which supplies pressurized hydraulic fluid to a fixed or variable-displacement hydraulic motor 218 via conduits 220. Motor 218 includes a shaft 222 which drives a gear-box 224 for turning shaft 208. A gear selector control 226 coupled to gear box 224 via linkage 228 is used to shift between gears for selecting any of several speed ranges such as low, medium and high. Transmission 206 can include mechanical, electrical or hydraulic controls.

The control system includes a control circuit 230 which receives engine speed signals from a sensor 232 via lines 234, crop processor load signals from sensors 236 via lines 238, and grain loss signals from a sensor 240 via lines 242. Control circuit 230 also receives sensed and site-specific data transmitted by DPU 82 over bus 84. The received data includes, for example, vehicle speed, sensed crop conditions, and anticipated conditions such as anticipated crop conditions and slopes. In response to the control inputs, control circuit 230 generates control signals applied via line 244 to a valve 246 coupled to pump 216. Valve 246 controls the flow of hydraulic fluid between pump 216 and motor 218. Thus, control circuit 230 controls vehicle speed based upon inputs including anticipated conditions.

Figure 8:
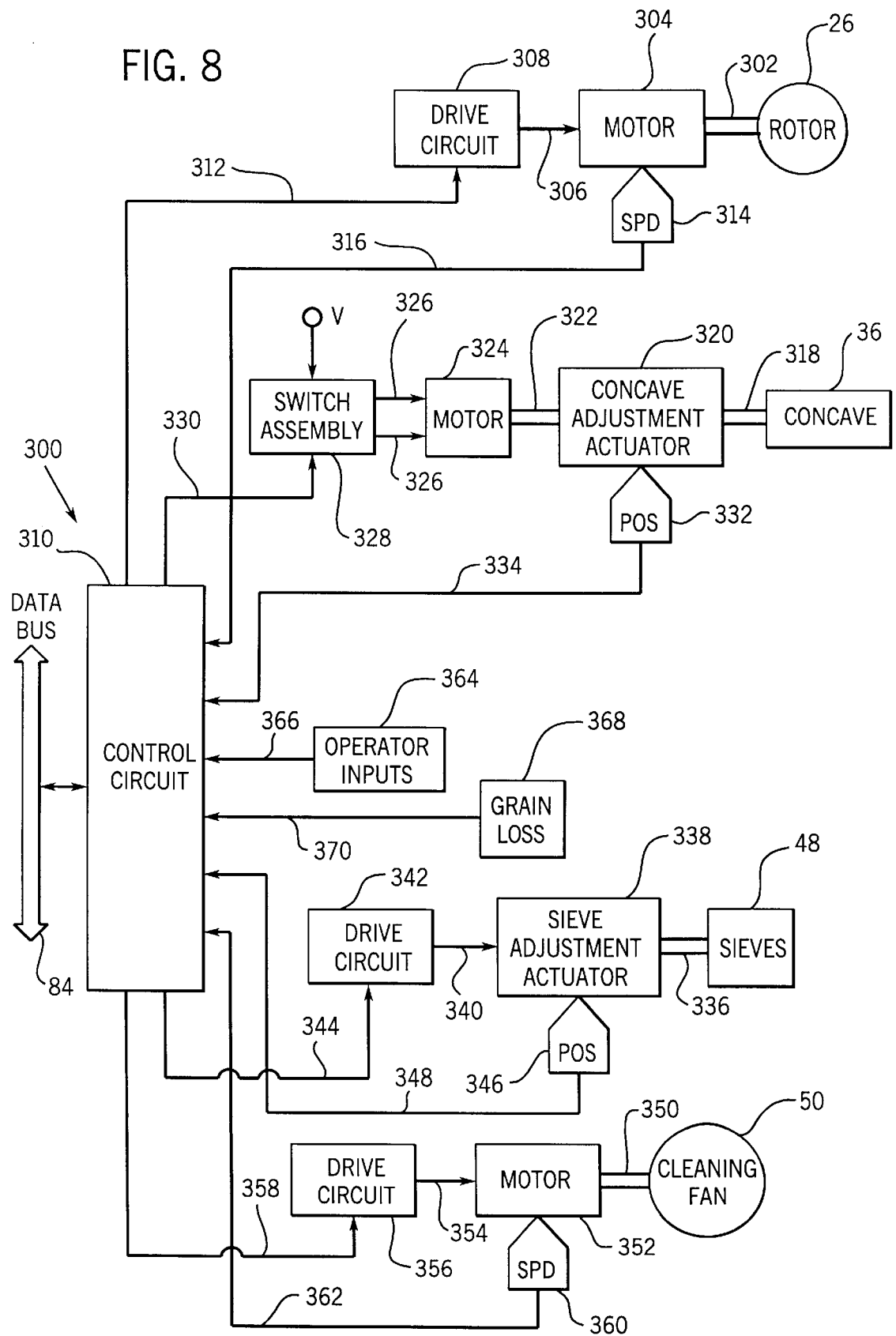
FIG. 8 is a block diagram illustrating a control system for controlling crop processors on a vehicle such as that in FIG. 1 wherein the control system includes a control circuit having an interface for a vehicle data bus.

FIG. 8 shows a control system for controlling the settings of four crop processors on vehicle 10. The first setting is rotor speed. Rotor 26 receives a shaft 302 driven by a motor 304 at a rotation speed set by signals 306 from a drive circuit 308. A control circuit 310 generates control signals applied to drive circuit 308 via lines 312, and receives feedback signals from a speed sensor 314 via lines 316 to allow for closed-loop control.

The second setting is concave clearance. The clearance of concave 36 is adjusted by a linkage 318 from a concave adjustment actuator 320 moved by rotation of a shaft 322 driven by a motor 324. The rotation depends on voltages applied to motor 324 via lines 326 from switch assembly 328. Control circuit 310 generates control signals applied to switch assembly 328 via lines 330, and receives feedback signals from a position sensor 332 via lines 334 to allow for closed-loop control.

The third setting is sieve opening. FIG. 8 shows the control system only for chaffer sieve 48, but other sieves such as grain sieve 52 are controlled in a similar manner. The openings are adjusted by a linkage 336 from a sieve adjustment actuator 338 controlled by signals on lines 340 from a drive circuit 342. Control circuit 310 generates control signals applied to drive circuit 342 via lines 344, and receives feedback signals from a position sensor 346 via lines 348 to allow for closed-loop control.

The fourth setting is cleaning fan speed. Fan 50 receives a shaft 350 driven by a motor 352 at a rotation speed set by signals 354 from a drive circuit 356. Control circuit 310 generates control signals applied to drive circuit 356 via lines 358, and receives feedback signals from a speed sensor 360 via lines 362 to allow for closed-loop control.

Control circuit 310 further receives operator input signals from interface 364 via lines 366 and grain loss signals from loss sensor 368 via lines 370. In addition, control circuit 310 receives sensed and site-specific data transmitted by DPU 82 over bus 84. Although FIG. 8 shows one control circuit used to control multiple crop processor settings, the settings could be controlled by individual control circuits. Thus, control circuit 310 controls crop processor settings such as rotor speed, concave clearance, sieve openings, and cleaning fan speed based upon inputs including anticipated conditions.

Figure 9:
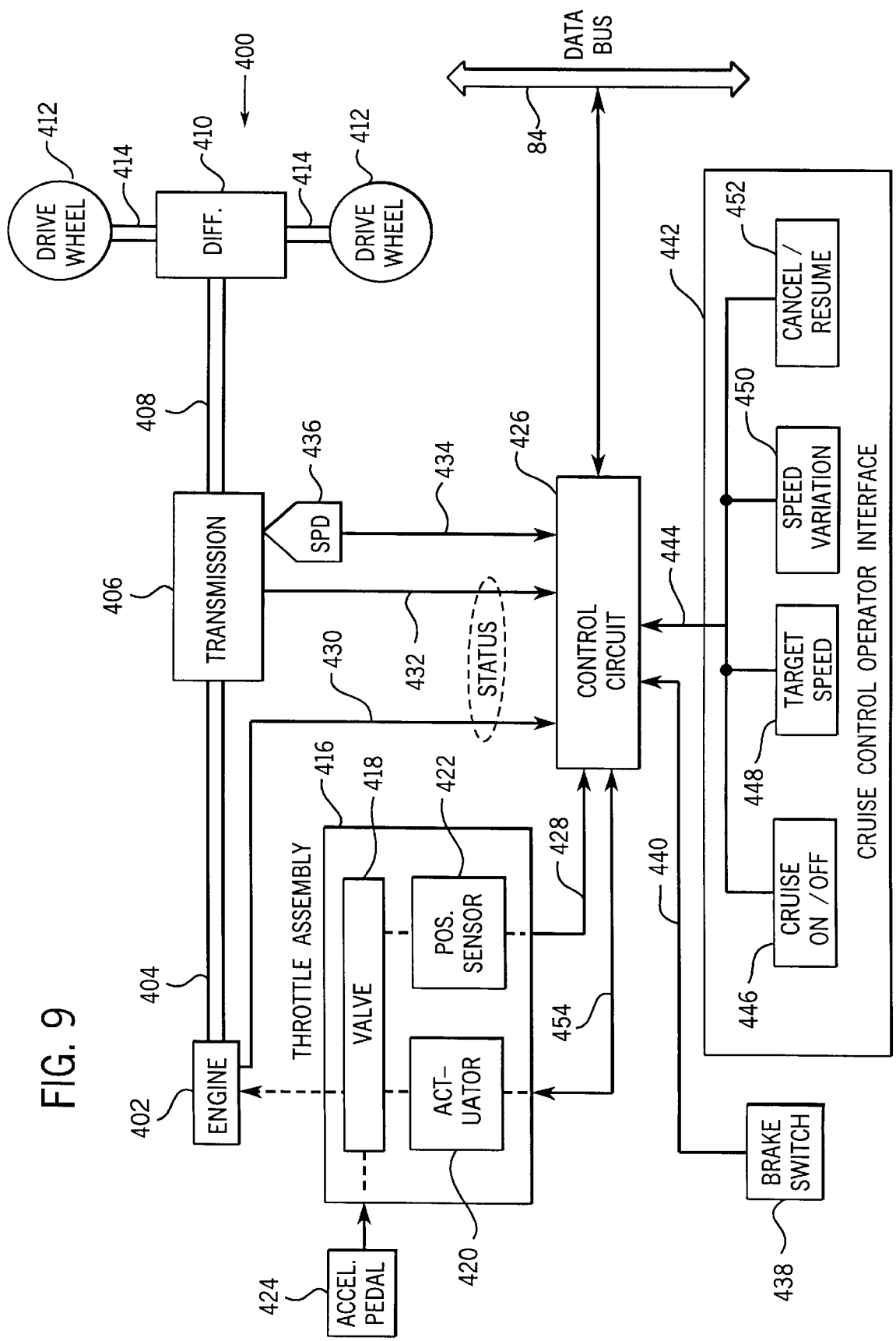
FIG. 9 is a block diagram illustrating a control system for controlling vehicle speed which includes a control circuit having an interface for communicating with a site-specific processor over a vehicle data bus.

FIG. 9 shows a control system for controlling the speed of a vehicle. A drive train 400 is powered by an internal-combustion engine 402. Engine 402 drives an input shaft 404 of a transmission 406 having an output shaft 408 coupled to a differential 410 for distributing power to drive wheels 412 via axle 414. Engine speed is responsive to a throttle assembly 416 having a throttle valve 418 for supplying fuel to engine 402, an actuator 420 for adjusting valve 418, and a position sensor 422 for sensing valve position. In a manual mode, actuator 420 does not affect valve 418, and engine speed depends only upon an accelerator pedal 424 moved by the operator. In a cruise control mode, however, the valve position is further controlled by a control circuit 426.

Control circuit 426 receives the position signals from sensor 422 via lines 428, engine and transmission status signals (e.g., engine speed and selected gear) via lines 430 and 432, vehicle speed signals via lines 434 from a speed sensor 436 coupled to transmission 406, brake status signals from a brake switch 438 via lines 440, and signals from an operator interface 442 via lines 444. Interface 442 includes an ON/OFF input device 446 for turning cruise control on and off, a target speed input device 448 for setting a target vehicle speed, a speed variation input device 450 for setting an allowed variation from the target speed during cruise control, and a CANCEL/RESUME device 452 to cancel and resume cruise control. Devices 446 and 452 are switches, device 448 is a potentiometer or a switch to select the current vehicle speed and device 450 is a potentiometer. Control circuit 426 also receives sensed and site-specific data transmitted by DPU 82 over bus 84 such as vehicle speed, sensed and anticipated conditions. In response to these inputs, control circuit 426 generates control signals applied via lines 454 to actuator 420 for adjusting valve 418. Thus, control circuit 426 controls vehicle speed based upon inputs including anticipated conditions.

Figure 10:
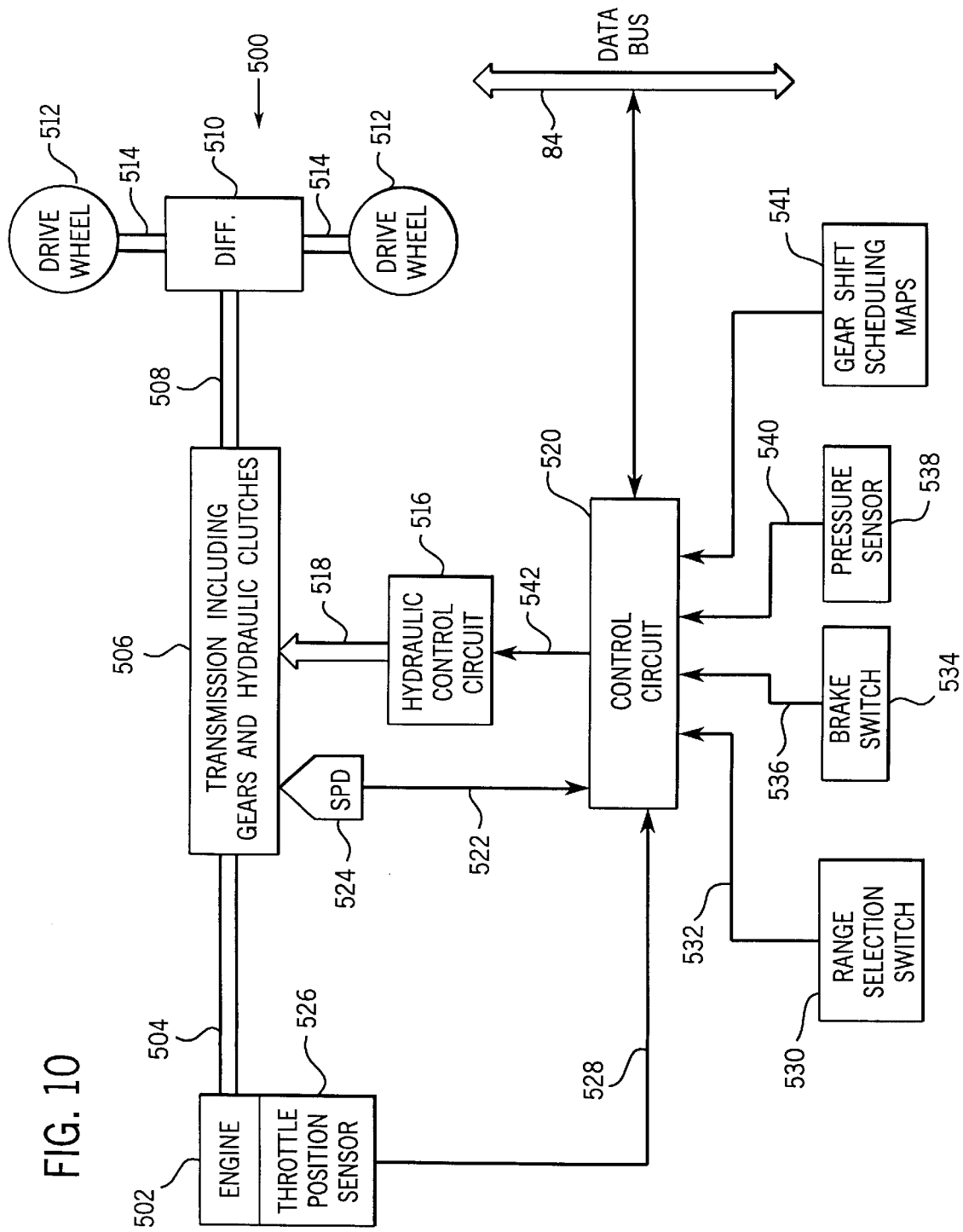
FIG. 10 is a block diagram illustrating a control system for controlling an automatic transmission on a vehicle wherein the control system includes a control circuit having an interface for communicating with a site-specific processor over a vehicle data bus.

FIG. 10 shows a control system for controlling an automatic transmission on a vehicle. A drive train 500 is powered by an internal-combustion engine 502. Engine 502 drives an input shaft 504 of an automatic transmission 506 having an output shaft 508 coupled to a differential 510 for distributing power to drive wheels 512 via axle 514. Transmission 506 changes the ratio between the speeds of shafts 504 and 508 using a plurality of gears engaged by hydraulic clutches responsive to hydraulic signals from hydraulic control circuit 516 via conduits 518. Engine speed depends upon a throttle valve (not shown).

A control circuit 520 receives a speed signal via lines 522 from a speed sensor 524 coupled to transmission 506, a throttle valve position signal from a sensor 526 via lines 528, a range signal from a switch 530 via lines 532, a brake status signal from a brake-operated switch 534 via lines 536, and a pressure signal from a sensor 538 via lines 540. In addition, control circuit 520 can select among a plurality of gear shift scheduling maps stored in a memory 541. The maps include schedules for gear shifts based upon vehicle speed and throttle valve position. Multiple maps are defined for use in different conditions such as the vehicle being on an up-hill, flat or down-hill slope. Control circuit 520 also receives sensed and site-specific data transmitted by DPU 82 over bus 84 such as vehicle speed, sensed and anticipated conditions. In response to these inputs, control circuit 520 generates control signals applied via lines 542 to hydraulic control circuit 516 for selecting gears. Thus, control circuit 520 controls an automatic transmission based upon inputs including anticipated conditions.

Figure 11:
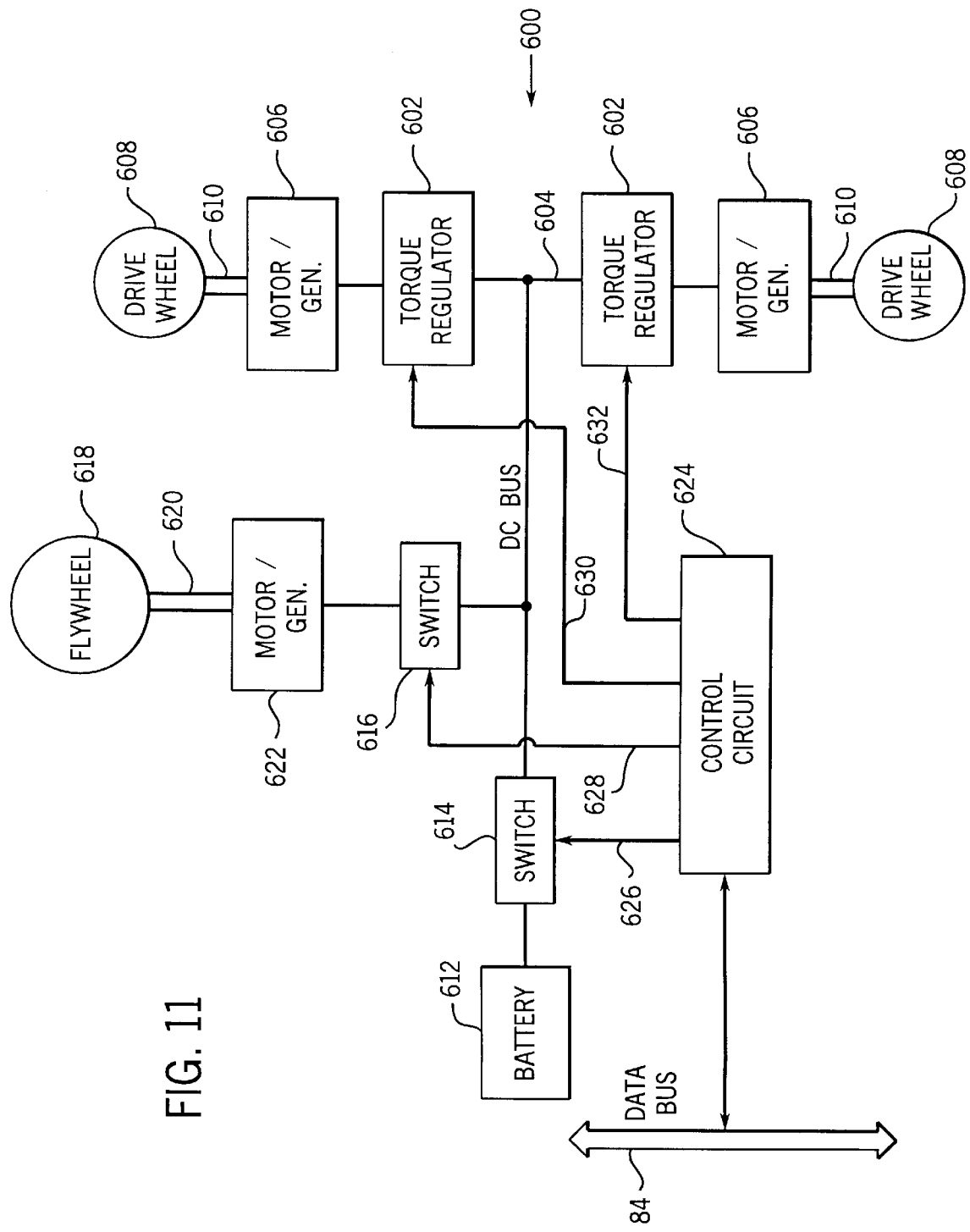
FIG. 11 is a block diagram illustrating a control system for controlling an energy exchanger on an electric vehicle wherein the control system includes a control circuit having an interface for communicating with a site-specific processor over a vehicle data bus.

FIG. 11 shows a control system for controlling an energy exchanger on an electric vehicle. A drive train 600 includes left and right torque regulators 602 which receive power from a bi-directional DC voltage power bus 604. Torque regulators 602 are coupled to left and right motor/generators 606 which are configured to power drive wheels 608 via shafts 610 using power from power bus 604 under certain operating conditions, and to generate power for power bus 604 in response to rotation of drive wheels 608 under other operating conditions. The main vehicle power source is a battery 612 selectively coupled to bus 604 by a switch 614. Alternatively, battery 612 could be replaced by a fuel engine coupled to a generator. A switch 616 selectively couples power bus 604 to an energy storage device 618 such as a flywheel. Flywheel 618 is attached to a shaft 620 of a motor/generator 622. Energy is stored in flywheel 618 when motor/generator 622 acts as a motor to drive shaft 620 under certain operating conditions, and energy is released from flywheel 618 when motor/generator 622 acts as a generator under other conditions.

A control circuit 624 receives sensed and site-specific data transmitted by DPU 82 over bus 84 such as vehicle speed, sensed and anticipated conditions. In response to these inputs, control circuit 624 generates control signals applied to switches 614 and 616, and to torque regulators 602 via lines 626–632. Thus, control circuit 624 controls exchanges of energy between battery 612, flywheel 618, and drive train 600 based upon inputs including anticipated conditions.

Figure 12:
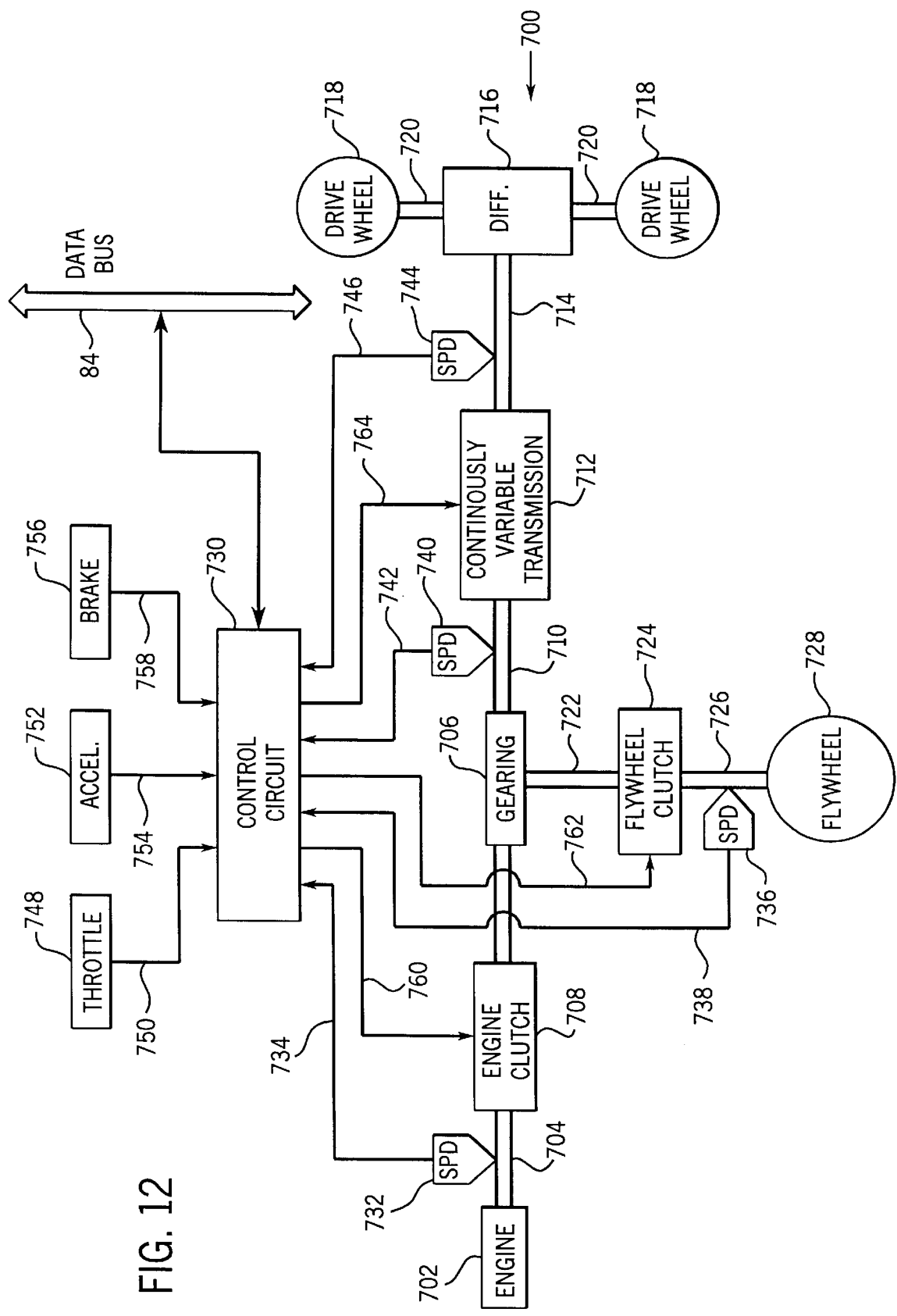
FIG. 12 is a block diagram illustrating a control system for controlling an energy exchanger on a fuel-engine vehicle wherein the control system includes a control circuit having an interface for communicating with a site-specific processor over a vehicle data bus.

FIG. 12 shows a control system for controlling an energy exchanger on a fuel-engine vehicle. A drive train 700 is primarily powered by an internal-combustion engine 702. Engine 702 drives a shaft 704 selectively engaged to a gearing 706 by an engine clutch 708. Gearing 706 drives a shaft 710 which feeds a continuously-variable transmission 712 having an output shaft 714 coupled to a differential 716 for distributing power to drive wheels 718 via axle 720. Gearing 706 is further coupled by a shaft 722 to a flywheel clutch 724 selectively engaged to a shaft 726 of a flywheel 728. Thus, energy for driving wheels 718 is generated by engine 702 or flywheel 728 depending upon the states of clutches 708 and 724.

A control circuit 730 receives an engine speed signal from a sensor 732 coupled to shaft 704 via lines 734, a flywheel speed signal from a sensor 736 coupled to flywheel 728 via lines 738, a gearing speed signal from a sensor 740 coupled to shaft 710 via lines 742, and a vehicle speed signal from a sensor 744 coupled to shaft 714 via lines 746. Control circuit 730 also receives signals from a throttle 748 via lines 750, an accelerator 752 via lines 754, and a brake 756 via lines 758. Further, control circuit 730 receives sensed and site-specific data transmitted by DPU 82 over bus 84 such as vehicle speed, sensed and anticipated conditions. In response to these inputs, control circuit 730 generates control signals applied to clutches 708 and 724 and transmission 712 via lines 760–764, respectively. Thus, control circuit 730 controls exchanges of energy between engine 702, flywheel 728, and drive train 700 based upon inputs including anticipated conditions.

Figure 13:
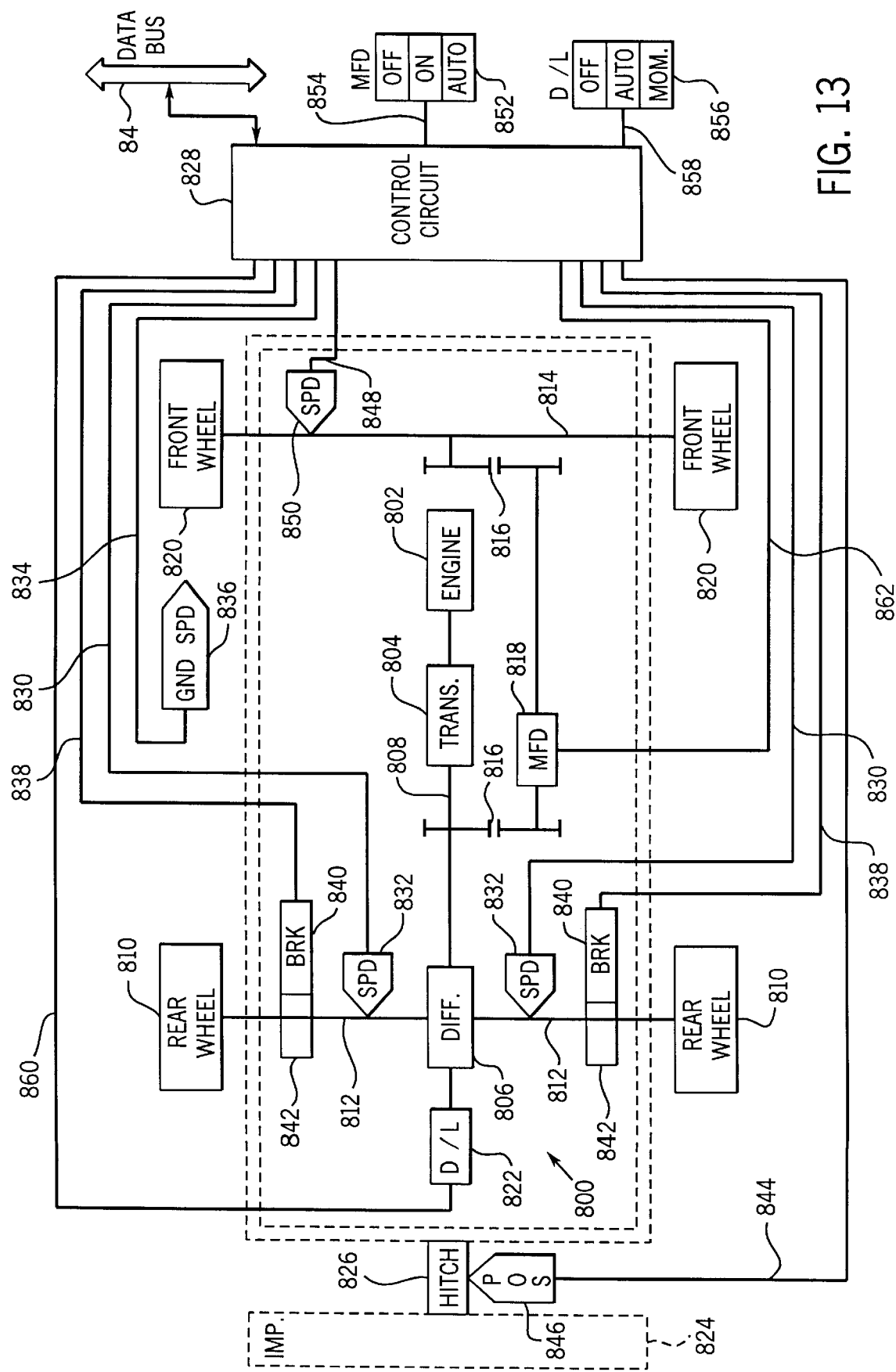
FIG. 13 is a block diagram illustrating a control system for controlling a front-wheel drive clutch and a differential lock on a vehicle wherein the control system includes a control circuit having an interface for communicating with a site-specific processor over a vehicle data bus.

FIG. 13 shows a control system for controlling a front-wheel drive clutch and a differential lock on a vehicle such as a tractor. A drive train 800 is powered by an internal-combustion engine 802. Engine 802 drives a transmission 804 coupled to a differential 806 by a shaft 808 for distributing power to drive wheels 810 via a rear axle 812. Shaft 808 is selectively engaged to a front axle 814 via gearings 816 and a front-wheel drive clutch 818. Front wheels 820 are driven when clutch 818 is engaged. Differential 806 can be locked and unlocked by a differential lock circuit 822. When the vehicle is a tractor, an implement 824 is supported for vertical movement by a hydraulically-driven hitch assembly 826.

A control circuit 828 receives rear-wheel speed signals via lines 830 from sensors 832 coupled to shaft 812, a vehicle speed signal via lines 834 from a ground speed sensor 836 (e.g., radar) mounted to the body of the vehicle, brake status signals via lines 838 from brake-operated switches 840 coupled to service brakes 842, a hitch position signal via lines 844 from a sensor 846 coupled to hitch 826, and a front-wheel speed signal via lines 848 from a sensor 850 coupled to shaft 814. Control circuit 828 also receives an OFF/ON/AUTO signal from a front-wheel drive switch 852 via lines 854, and an OFF/AUTO/MOMENTARY signal from a differential lock switch 856 via lines 858. Further, control circuit 828 receives sensed and site-specific data transmitted by DPU 82 over bus 84 such as vehicle speed, sensed and anticipated conditions. In response to these inputs, control circuit 828 generates control signals applied to differential lock circuit 822 via lines 860, and to front-wheel drive clutch 818 via lines 862. Thus, control circuit 828 controls a front-wheel drive clutch and a differential lock based upon inputs including anticipated conditions. Rear wheel assist on a combine may also be so controlled.

Aspects of the above-described control systems, and control logic which is not related to using anticipated conditions, are described in the following U.S. Pat. Nos.: 4,130,980 (FIG. 7); 4,348,855, 5,489,239, 5,527,241 and 4,466,230 (FIG. 8); 5,392,215 (FIG. 9); 5,531,654 (FIG.

10); 4,495,451 (FIG. 11); 4,171,029 (FIG. 12); and 5,505,267 (FIG. 13). These patents are incorporated herein by reference.

Figure 14:
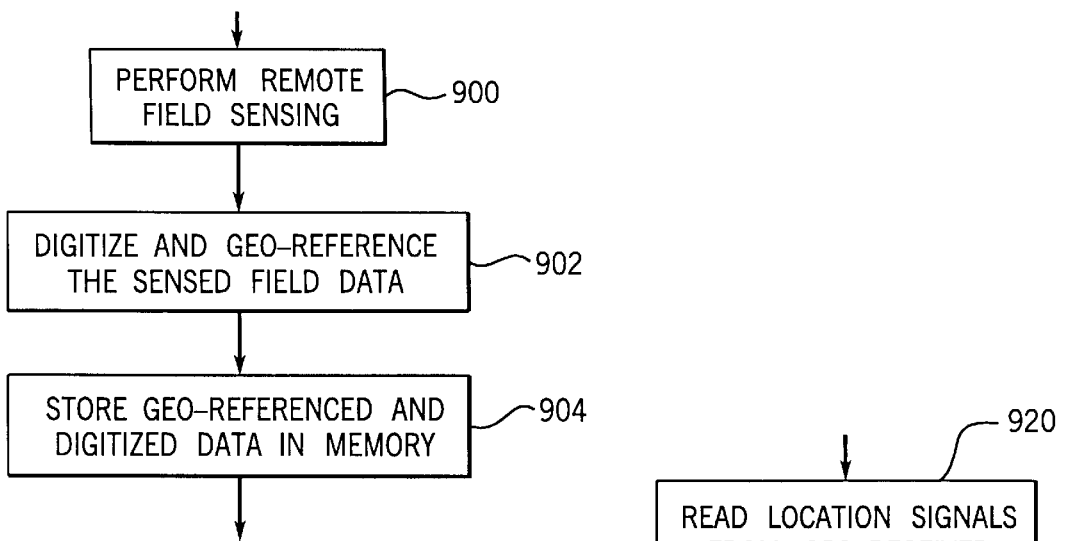
FIG. 14 is a flow chart representing steps for generating predetermined geo-referenced maps of a field which include spatially-variable data indicative of anticipated crop conditions throughout the field.

FIG. 14 represents a process for generating a predetermined geo-referenced map of crop conditions such as the anticipated yield map shown in FIG. 4. Steps include remotely sensing the field (step 900), digitizing and geo-referencing (i.e., registering) the sensed field data (step 902), and storing the resulting data in memory card 90 (step 904). Such data can include anticipated yield, total crop-mass flow, moisture content and other crop data (e.g., insect or weed infestation, chemicals).

Remote sensing may include taking aerial photographs of a field, or generating spectral images from airborne or spaceborne sensors. Techniques for remotely sensing crop conditions are known, including those described in U.S. Pat. No. 5,467,271 and "Remote Sensing of Vegetation Characteristics for Farm Management", Volume 475, Society of Photo-Optical Instrumentation Engineers, pp. 81–96 (1984), incorporated herein by reference. Typically, a field is remotely sensed several (e.g., 1–3) days or even hours before harvest. However, a field could be remotely sensed at or close to harvest time provided anticipated crop condition data for a position in a field is available before vehicle 10 reaches the position.

Geo-referenced maps including crop condition data could also be predetermined using other techniques. One such technique uses computer 88 to process layers of data stored prior to harvest which bear relationships to the anticipated crop condition. For example, layers of data such as soil type, crop type, farming inputs applied (e.g., seed, fertilizer, herbicide, insecticide), weather conditions during growing season and past performance may reasonably relate to yield, total mass flow or moisture content such that these crop conditions can be predicted. These relationships should become better defined as site-specific farming research continues.

Geo-referenced maps could also be predetermined by surveying a field or road. For example, a survey could be used to predetermine the geo-referenced road network and altitude maps shown in FIGS. 5 and 6. The survey can be performed using conventional surveying techniques, or by storing geo-referenced data using surveying systems equipped with GPS receivers and automated data storage. A survey can also be used to predetermine crop condition maps as in FIG. 4 using manual observations and grids.

The control circuits for each vehicle system perform the steps shown in FIG. 15. The steps performed by the control circuit for each vehicle system may be performed both in DPU 82 and by control circuit 230, 310, 426, 520, 624, 730 or 828, in any combination, with the needed data flowing across vehicle data bus 84. Steps 920, 924 and 926 were described above in relation to FIGS. 4–6.

Steps 922, 928 and 930 can be used to calibrate the prediction of the anticipated condition. These steps are optional because they are not needed when the anticipated conditions are sufficiently accurate. Calibration, for example, may be unnecessary if the anticipated condition is anticipated altitude or slope since the altitude data stored in a pre-determined geo-referenced map may be very accurate. Similarly, calibration may be unnecessary for anticipated crop conditions if the geo-referenced map includes relatively accurate crop condition data. This will depend upon the accuracy of the technique used to generate the predetermined geo-referenced map.

When the map data is not accurate enough for control purposes, the prediction of anticipated conditions may be calibrated by sensing the actual conditions and comparing the sensed signals to the earlier-predicted anticipated conditions for the same positions. For example, assume that a combine is traveling at 3 mph, and that 10 seconds elapse between when crop is cut and yield is measured. A distance of 44 feet is travelled during those 10 seconds. Thus, a sensed yield (e.g., 96 bu/acre) corresponding to the crop that was cut 44 feet or 10 seconds ago can be compared to the anticipated yield (e.g., 93 bu/acre) that was predicted for that same position. The difference or error value can be used to generate a calibration signal for adjusting the current prediction. In this example, the 3 bu/acre error indicates that the prediction gave an anticipated yield which is too low. The calibration signal can be used to compensate further predictions.

At step 932, the control circuit generates a control signal based at least upon the anticipated condition. At step 934, the control signal is applied to the respective vehicle system. As described above, the control circuits may generate the control signals based upon other control inputs and conventional algorithms in certain situations. This description focuses on using anticipated conditions for adjusting or overriding such control signals. For illustrative purposes, this description refers back to the situations represented by FIGS. 4–6.

Referring back to FIG. 4, anticipated yield along the course of travel of vehicle 10 has increased quickly from below 25 bu/acre to between 100 and 124 bu/acre at the current position of implement 18 and for a distance along the expected course of travel shown by arrow 162. Sensed yield data is stale and corresponds to crop that was cut 5 or 10 seconds earlier (e.g., 20 bu/acre). As explained above, conventional automatic control circuits would interpret the low sensed yield to indicate that the power demand of the crop processors is low, and vehicle 10 would be commanded to travel at too high a speed. By predicting anticipated yield data (e.g., 110 bu/acre) control circuits 230 and 310 accommodate the increased yield of crop being harvested by slowing the vehicle to shift power to the crop processors, and by adjusting the crop processors settings to accommodate heavier yields. Conversely, if anticipated yield is lower than sensed yield, vehicle speed and the crop processor settings are adjusted to accommodate the decreased yields.

If the anticipated data in FIG. 4 was altitude data, vehicle 10 would be traveling up or down a slope. If vehicle 10 is traveling, or is expected to travel, up-hill, increased engine load can be accommodated with a reduced vehicle speed. If vehicle 10 is traveling, or is expected to travel, down-hill, decreased engine load can be accommodated by increasing vehicle speed. In both cases, the crop processors can be adjusted appropriately.

Referring back to FIGS. 5 and 6, a vehicle at the position shown by marker 160 is expected to travel along a course indicated by arrow 162. The expected course of travel includes a predicted turn of radius R just forward of the current position (at-marker 160), followed by an anticipated down-hill slope averaging 10 degrees from an elevation of 1050 feet at the current position to 750 feet at the road junction, followed by an anticipated up-hill slope to 1050 feet along road 172.

If the vehicle is equipped with a cruise control system such as shown in FIG. 9, and the cruise control system is turned on by switch 446, vehicle speed can be automatically controlled based upon the target speed set by input device 448. Control circuit 426 can predict the turn and the radius R based upon the change in direction along the expected course from north-east to due east. A system for predicting turns is disclosed, for example, in U.S. Pat. Nos. 5,315,295 or 5,546,311, both incorporated herein by reference. In response, the vehicle speed is lowered from the target speed before entering the curve, and increased as the vehicle comes out of the curve. The speed variation can be selected to improve stability of the vehicle. The speed reduction, however, can also be selected to accommodate changes in the expected normal force on the vehicle to increase operator comfort. Thus, vehicle speed is varied similar to the manner in which it would be varied by a skilled driver. Maximum speed variations can be limited using device 450. Also, speed variation can be inhibited at predetermined values of vehicle speed or expected normal force (i.e., $V^2/R$).

After the turn, the vehicle is expected to descend a hill and then, after the junction, ascend a hill. If the vehicle is equipped with a speed control system such as in FIGS. 7 or 9, the control signals can be adjusted to accommodate the expected affect on engine load. Control circuit 230, for example, can increase vehicle speed or shift power to crop processors on or before the down-hill slope since less power will be needed to drive down-hill. Control circuit 426 can adjust throttle valve 418 to accommodate the affect on engine load on or before the down-hill slope. Throttle valve 418 can, for example, decrease engine speed in anticipation of a down-hill slope so that vehicle speed remains closer to the target speed after the slope starts. Thus, control circuit 426 can maintain a more accurate constant vehicle speed since it need not wait for the error between the target and vehicle speeds to increase before adjusting the throttle. Also, slowing the vehicle below the target speed before reaching the down-hill slope can be used to decrease the braking required later and to conserve fuel. Allowed speed variations can be limited using a device such as device 450. Converse adjustments can also be made for up-hill slopes. For example, increasing speed before a vehicle reaches an up-hill slope builds momentum for the climb. This type of speed boost is often commanded manually by, for example, truck drivers. The amount of the boost can be limited by the speed variation signal.

If the vehicle has an automatic transmission control system such as in FIG. 10, the anticipated slope can be used to select an appropriate gear shift schedule. Such schedules can account for changes in engine load due to slope at the current position. Control circuit 520 can also cause gear shifts to occur before reaching a slope. For example, control circuit 520 can cause a down-shift before the vehicle starts to descend to decrease braking required later, or can cause an up-shift to increase fuel economy. A down-shift can be caused before starting to climb a hill to increase power available for climbing.

If the vehicle has an energy exchange control system such as in FIGS. 11 or 12, a control circuit causes an energy exchanger to release energy from an energy storage device before starting a descent, and recharge the energy storage device during the descent. Energy can also be released in anticipation of braking or deceleration due to down-hill slopes or stopping positions, and recharged when the vehicle actually does brake or decelerate. Energy can also be released in anticipation of the end of a trip. Thus, the systems use energy more efficiently by anticipating conditions along the course of travel.

If the vehicle has a control system for a front-wheel drive clutch or a differential lock such as in FIG. 13, the control circuit can engage or disengage front-wheel drive or the differential before reaching a hill. For example, if the vehicle is about to ascend a hill, four-wheel drive can be engaged or the differential can be locked before slipping occurs. This may prevent excessive slippage from occurring in the first place, thereby helping to prevent the vehicle from becoming stuck. A clutch can also be automatically engaged, or a differential can be automatically locked, when a current or anticipated slope exceeds a predetermined value (e.g, 10 degrees), or an anticipated condition indicates that traction will decrease or drive load will increase. Rear wheel assist on a combine can be similarly controlled.

If the vehicle is a tractor pulling implement 824 through soil, the draft force exerted on hitch 826 will depend upon soil conditions (e.g, compaction; soil type). For example, the draft force will be higher when the soil is compact or the soil type is clay than when the soil is loose or the soil type is sandy. Anticipated conditions of the soil which will affect the draft force exerted by implement 824 can be predetermined and stored in a geo-referenced map (e.g., by analyzing samples taken during a soil survey and storing the results in a soil-type map).

Changes in draft force due to soil conditions will affect the load on the tractor's engine and transmission. These affects can be accommodated by the above-described control systems. For example, if anticipated conditions along the course of travel of a tractor predict that the soil will become more compact, the transmission can be downshifted, vehicle speed can be decreased, and/or four-wheel drive can be engaged before implement 824 reaches the more compact soil. Thus, changes in load caused by changes in soil condition can be accommodated even before the draft force changes and even before changes in draft force can be sensed. The proactive response may prevent slippage when the more compact soil is actually reached.

Further, predictions of anticipated soil conditions using predetermined soil condition maps can be calibrated by comparing actual draft forces sensed using draft force sensors to earlier-predicted anticipated soil conditions for substantially the same positions of the tractor. For example, the sensed draft force signals can be compared to predetermined soil conditions for the same positions, and the results can be used to calibrate predictions of how the soil along the course of travel will affect load. A control system for a hitch assembly including draft force sensors is described in U.S. Pat. No. 5,421,416, incorporated herein by reference.

The control systems disclosed herein can accommodate affects of more than one anticipated condition at a time. Two or more anticipated conditions may have cumulative affects, or may have affects which partially or fully cancel each other. For example, a combine entering an area of a field where anticipated conditions include dense crop and an up-hill slope may decrease vehicle speed to account for the cumulative increase in drive train loading due to both anticipated conditions. If anticipated conditions include dense crop and a down-hill slope, the affects on loading will partially or fully cancel each other and any change in vehicle speed will depend upon the relative magnitude of the conditions. For another example, similar cumulative and cancelling affects will occur when the vehicle is a tractor and the anticipated conditions are slopes and soil conditions.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims.

What is claimed is:

1. In an agricultural working vehicle including a drive train powered by an engine for moving along a course of travel, a control system for controlling a vehicle system at least partly in response to an anticipated condition along the course of travel which will affect engine load, comprising:

a location signal generation circuit supported by the vehicle and configured to receive positioning signals and to generate location signals therefrom which represent the current position of the vehicle;

a memory circuit for storing a predetermined geo-referenced map including spatially-variable map data indicative of anticipated conditions of crop along the course of travel which will affect engine load; and a control circuit coupled to the location signal generation circuit, the memory circuit and the vehicle system, the control circuit being configured to predict the anticipated condition using at least the location signals and the map data, to generate a control signal based at least upon the anticipated condition to accommodate the affect on engine load, and to apply the control signal to the vehicle system.

2. The control system of claim 1 further including a sense circuit coupled to the control circuit, the sense circuit being configured to generate a sensed signal representative of an actual condition along the course of travel, wherein the control circuit compares the actual condition to an earlier-predicted anticipated condition for substantially the same position of the vehicle, and the comparison results are used to calibrate the prediction of a further anticipated condition.

3. The control system of claim 1 wherein the location signal generation circuit includes a global positioning system (GPS) receiver.

4. The control system of claim 1, wherein the map data also represents altitudes along the course of travel, and the control circuit is also configured to predict an anticipated slope based upon a change in altitude along the course, and the control signal also depends on the anticipated slope.

5. The control system of claim 1 wherein the agricultural working vehicle is an agricultural harvesting vehicle.

6. The control system of claim 5 wherein the vehicle system includes a crop processor having settings selected in response to the control signal, whereby the selected setting depends upon the anticipated condition.

7. The control system of claim 1 wherein the control circuit is further configured to determine an expected position of the vehicle forward of the current position along the course of travel, and the anticipated condition depends on the expected position.

8. The control system of claim 7 further including a speed sense circuit coupled to the control circuit, the speed sense circuit configured to generate a speed signal representative of vehicle speed, the expected position being an offset distance forward of the current position, and the offset distance depending upon the vehicle speed.

9. The control system of claim 1 wherein the vehicle system includes a device selected from the group consisting of a speed actuator, a transmission, an energy exchanger, a clutch, and a differential.

10. The control system of claim 1 wherein the map data which is indicative of anticipated conditions of crop along the course of travel is predetermined before the vehicle begins to travel along the course of travel.

11. The control system of claim 1 wherein the map data which is indicative of anticipated conditions of crop along the course of travel is predetermined for a position in a field before the vehicle reaches the position.

12. In a vehicle including a drive train powered by an engine for moving along a course of travel, a control system for controlling a vehicle system at least partly in response to an anticipated condition along the course of travel which will affect engine load, comprising:

a location signal generation circuit supported by the vehicle and configured to receive positioning signals and to generate location signals therefrom which represent the current position of the vehicle;

a memory circuit for storing a predetermined geo-referenced map including spatially-variable map data indicative of anticipated conditions along the course of travel which will affect engine load; and a control circuit coupled to the location signal generation circuit, the memory circuit and the vehicle system, the control circuit being configured to predict the anticipated condition using at least the location signals and the map data, to generate a control signal based at least upon the anticipated condition to accommodate the affect on engine load, and to apply the control signal to the vehicle system;

wherein the vehicle is an agricultural tractor including a hitch assembly configured to pull an implement through soil, and the map data represents anticipated soil conditions along the course of travel.

13. The control system of claim 10 further including a draft force sensing circuit coupled to the control circuit and configured to generate a sensed draft force signal, wherein the control circuit compares the sensed draft force to an earlier-predicted anticipated soil condition for substantially the same position of the vehicle, and the comparison results are used to calibrate the prediction of a further anticipated soil condition.

14. In a vehicle including a drive train powered by an engine for moving along a course of travel, a control system for controlling vehicle speed at least partly in response to an anticipated condition along the course of travel which will affect engine load, the vehicle speed dependent upon settings of a speed actuator, comprising:

a location signal generation circuit supported by the vehicle and configured to receive positioning signals and to generate location signals therefrom which represent the current position of the vehicle;

a memory circuit for storing a predetermined geo-referenced map including spatially-variable map data indicative of anticipated conditions along the course of travel which will affect engine load;

a target speed input device for generating a target speed signal representative of a target speed for the vehicle;

a speed sense circuit for generating a speed signal representative of vehicle speed; and a control circuit coupled to the location signal generation circuit, the memory circuit, the target speed input device the speed sense circuit and the speed actuator, the control circuit being configured to predict the anticipated condition using at least the location signals and the map data, to generate a control signal based at least upon the anticipated condition to accommodate the affect on engine load, and to apply the control signal to the speed actuator, wherein the generation of the control signal is further based upon a comparison between the target speed and vehicle speed, and the anticipated condition includes an anticipated slope along the course of travel.

15. The control system of claim 12 wherein the map data represents altitudes along the course of travel, and the anticipated condition includes the anticipated slope based upon a change in altitude along the course.

16. The control system of claim 14 wherein, when the anticipated slope indicates an anticipated down-hill slope, the control circuit adjusts the control signal to decrease the vehicle speed.

17. The control system of claim 16 further including a speed variation input device coupled to the control circuit for generating a speed variation signal, wherein the control signal is adjusted to keep the vehicle speed within a range of the target speed determined by the speed variation signal.

18. The control system of claim 14 wherein, when the anticipated slope indicates an anticipated up-hill slope, the control circuit adjusts the control signal to increase the vehicle speed.

19. The control system of claim 14 wherein the control circuit is further configured to predict a turn based upon a change in direction forward of the current position along the course of travel, and the control signal further depends upon the predicted turn.

20. The control system of claim 19 wherein, before a predicted turn, the control circuit adjusts the control signal to decrease the vehicle speed.

21. The control system of claim 20 further including a speed variation input device coupled to the control circuit for generating a speed variation signal, wherein the control signal is adjusted to keep the vehicle speed within a range of the target speed determined by the speed variation signal.

22. The control system of claim 20 wherein the decrease in vehicle speed due to a predicted turn is inhibited based upon at least one of: (a) the vehicle speed and (b) the radius of the predicted turn.

23. In a vehicle including a drive train powered by an engine for moving along a course of travel, a control system for controlling vehicle speed at least partly in response to an anticipated condition along the course of travel which will affect engine load, the vehicle speed dependent upon settings of a speed actuator, comprising:
  a location signal generation circuit supported by the vehicle and configured to receive positioning signals and to generate location signals therefrom which represent the current position of the vehicle;
  a memory circuit for storing a predetermined geo-referenced map including spatially-variable map data indicative of anticipated conditions along the course of travel which will affect engine load; and
  a control circuit coupled to the location signal generation circuit, the memory circuit and the speed actuator, the control circuit being configured to predict the anticipated condition using at least the location signals and the map data, to generate a control signal based at least upon the anticipated condition to accommodate the affect on engine load, and to apply the control signal to the speed actuator;
  wherein the vehicle is an agricultural harvesting vehicle, and the map data represents anticipated conditions of crop along the course of travel.

24. The control system of claim 23 wherein the anticipated condition is selected from the group consisting of anticipated crop yield, anticipated total mass flow and anticipated moisture content.

25. The control system of claim 24 further including a sense circuit coupled to the control circuit, the sense circuit configured to generate a sensed signal representative of an actual condition of crop along the course of travel, wherein the control circuit compares the actual condition to an earlier-predicted anticipated condition for substantially the same position of the vehicle, and the comparison results are used to calibrate the prediction of a further anticipated condition.

26. The control system of claim 25 further including a loss sense circuit coupled to the control circuit for generating crop loss signals representative of crop loss and, when the anticipated condition is one of anticipated crop yield and anticipated total mass flow, the results of the comparison account for the crop loss at substantially the same position of the vehicle.

27. In an agricultural working vehicle including a drive train powered by an engine for moving along a course of travel, a control system for controlling a transmission at least partly in response to an anticipated condition along the course of travel, the transmission having a ratio selected in response to a control signal, comprising:
  a location signal generation circuit supported by the vehicle and configured to receive positioning signals and to generate location signals therefrom which represent the current position of the vehicle;
  a memory circuit for storing a predetermined geo-referenced map including spatially-variable map data indicative of anticipated conditions of crop along the course of travel; and
  a control circuit coupled to the location signal generation circuit, the memory circuit and the transmission, the control circuit being configured to predict the anticipated condition using at least the location signals and the map data, to generate the control signal based at least upon the anticipated condition, and to apply the control signal to the transmission.

28. The control system of claim 27 wherein the transmission is an automatic transmission having a plurality of gears selected in response to the control signal, whereby the selected gear depends upon the anticipated condition.

29. The control system of claim 28 wherein the memory circuit further stores a plurality of gear shift scheduling maps for scheduling shifts among the plurality of gears, and one of the scheduling maps is selected in response to the anticipated condition.

30. The control system of claim 27 wherein the transmission is a hydrostatic transmission for setting a speed ratio between the engine and vehicle wheels in response to the control signal, whereby the speed ratio depends upon the anticipated condition.

31. The control system of claim 27 wherein the map data also represents altitudes along the course of travel, and the control circuit is also configured to predict an anticipated slope based upon a change in altitude along the course, and the control signal also depends on the anticipated slope.

32. The control system of claim 31 wherein, when the anticipated slope indicates an anticipated change in altitude, the ratio is set to a value different than the ratio selected when the anticipated slope is flat.

33. The control system of claim 27 wherein the agricultural working vehicle is an agricultural harvesting vehicle.

34. The control system of claim 33 further including a sense circuit coupled to the control circuit, the sense circuit configured to generate a sensed signal representative of an actual condition of crop along the course of travel, wherein the control circuit compares the actual condition to an earlier-predicted anticipated condition for substantially the same position of the vehicle, and the comparison results are used to calibrate the prediction of a further anticipated condition.

35. In a vehicle including a drive train powered by an engine for moving along a course of travel, a control system for controlling a transmission at least partly in response to an anticipated condition along the course of travel, the transmission having a ratio selected in response to a control signal, comprising:
  a location signal generation circuit supported by the vehicle and configured to receive positioning signals and to generate location signals therefrom which represent the current position of the vehicle;

a memory circuit for storing a predetermined geo-referenced map including spatially-variable map data indicative of anticipated conditions along the course of travel; and a control circuit coupled to the location signal generation circuit, the memory circuit and the transmission, the control circuit being configured to predict the anticipated condition using at least the location signals and the map data, to generate the control signal based at least upon the anticipated condition, and to apply the control signal to the transmission;

wherein the control circuit is further configured to predict a turn based upon a change in direction forward of the current position along the course of travel, and the control signal further depends upon the predicted turn.

36. In an agricultural harvesting vehicle including a drive train powered by an engine for moving along a course of travel, a control system for controlling a vehicle system at least partly in response to an anticipated condition of crop along the course of travel, comprising:

a location signal generation circuit supported by the vehicle and configured to receive positioning signals and to generate location signals therefrom which represent the current position of the vehicle;

a memory circuit for storing a predetermined geo-referenced map including spatially-variable map data indicative of anticipated conditions of crop along the course of travel; and a control circuit coupled to the location signal generation circuit, the memory circuit and the vehicle system, the control circuit being configured to predict the anticipated condition of crop using at least the location signals and the map data, to generate a control signal based at least upon the anticipated condition of crop, and to apply the control signal to the vehicle system.

37. The control system of claim 36 wherein the anticipated condition is selected from the group consisting of anticipated crop yield, anticipated total mass flow and anticipated moisture content.

38. The control system of claim 36 wherein the vehicle system includes a speed actuator for setting vehicle speed in response to the control signal, whereby the vehicle speed depends upon the anticipated condition.

39. The control system of claim 38 wherein the anticipated condition is selected from the group consisting of anticipated crop yield and anticipated total mass flow, and the vehicle speed setting has an inverse relationship with the anticipated condition.

40. The control system of claim 39 further including a loss sensing circuit coupled to the control circuit for generating crop loss signals representative of crop loss, and the vehicle speed setting further depends upon the crop loss.

41. The control system of claim 36 wherein the vehicle system includes a transmission having a ratio selected in response to the control signal, whereby the selected ratio depends upon the anticipated condition.

42. The control system of claim 36 wherein the vehicle system includes a crop processor having settings selected in response to the control signal, whereby the selected setting depends upon the anticipated condition.

43. The control system of claim 42 wherein the crop processor includes a rotor for threshing the crop, the rotor speed selected in response to the control signal.

44. The control system of claim 42 wherein the crop processor includes a threshing assembly including a rotor and a concave located at least partially around the rotor, the concave being separated from the rotor by a concave clearance distance which is adjustable in response to the control signal.

45. The control system of claim 42 wherein the crop processor includes at least one sieve having openings which are adjustable in response to the control signal.

46. The control system of claim 42 wherein the crop processor includes a cleaning fan configured to create an airflow across at least one sieve, the cleaning fan speed selected in response to the control signal.

47. The control system of claim 36 further including a sense circuit coupled to the control circuit, the sense circuit configured to generate a sensed signal representative of an actual condition of crop along the course of travel, wherein the control circuit compares the actual condition to an earlier-predicted anticipated condition for substantially the same position of the vehicle, and the comparison results are used to calibrate the prediction of a further anticipated condition.

48. In an agricultural working vehicle driven by a drive train along a course of travel, a control system for controlling an energy exchanger at least partly in response to an anticipated condition along the course of travel, the energy exchanger configured to exchange energy between an energy storage device and the drive train, comprising:

a location signal generation circuit supported by the vehicle and configured to receive positioning signals and to generate location signals therefrom which represent the current position of the vehicle;

a memory circuit for storing a predetermined geo-referenced map including spatially-variable map data indicative of anticipated conditions of crop along the course of travel; and a control circuit coupled to the location signal generation circuit, the memory circuit and the energy exchanger, the control circuit being configured to predict the anticipated condition using at least the location signals and the map data, to generate a control signal based at least upon the anticipated condition, and to apply the control signal to the energy exchanger.

49. The control system of claim 48 wherein the energy storage device is selected from the group consisting of a flywheel and a battery.

50. The control system of claim 48 wherein the map data also represents altitudes along the course of travel, and the control circuit is also configured to predict an anticipated slope based upon a change in altitude along the course, and the control signal also depends on the anticipated slope.

51. In an agricultural harvesting vehicle including a drive train powered by an engine for moving along a course of travel over a field, a method of controlling a vehicle system at least partly in response to an anticipated condition of crop along the course of travel, the method comprising the steps of:

generating a geo-referenced map of the field including data indicative of anticipated conditions of crop along the course of travel by remotely sensing the field prior to harvest, digitizing and geo-referencing the sensed signals, and storing the geo-referenced and digitized signals in a memory circuit;

receiving positioning signals from an external source as the vehicle travels in the field and generating location signals therefrom which represent the current position of the vehicle;

predicting the anticipated condition using at least the location signals and the map data; and generating a control signal based at least upon the anticipated condition and applying the control signal to the vehicle system.

52. The method of claim 51 further comprising the steps of:

generating a sensed signal representative of an actual condition of crop along the course of travel;

comparing the actual condition of crop to an earlier-predicted anticipated condition for substantially the same position of the vehicle; and calibrating the prediction of a further anticipated condition of crop using the results of the comparison.

53. The method of claim 51 wherein the step of generating a geo-referenced map of the field includes taking an aerial photograph of the field.

54. The method of claim 51 wherein the step of generating a geo-referenced map of the field includes generating spectral images of the field.

55. The method of claim 54 wherein the step of generating spectral images of the field includes generating images using an airborne sensor.

56. The method of claim 54 wherein the step of generating spectral images of the field includes generating images using a spaceborne sensor.

57. The method of claim 51 wherein the step of generating a geo-referenced map of the field takes place before the vehicle begins to travel along the course of travel.

58. The method of claim 51 wherein the step of generating a geo-referenced map of the field takes place such that anticipated conditions of crop along the course of travel are predetermined for a position in the field before the vehicle reaches the position.

59. In an agricultural working vehicle including a drive train powered by an engine for moving along a course of travel, a control system for controlling a device selected from the group consisting of a clutch and a differential at least partly in response to an anticipated condition along the course of travel, the device being engaged and disengaged in response to a control signal, comprising:

a location signal generation circuit supported by the vehicle and configured to receive positioning signals and to generate location signals therefrom which represent the current position of the vehicle;

a memory circuit for storing a predetermined geo-referenced map including spatially-variable map data indicative of anticipated conditions of crop along the course of travel; and a control circuit coupled to the location signal generation circuit, the memory circuit and the device, the control circuit being configured to predict the anticipated condition using at least the location signals and the map data, to generate the control signal based at least upon the anticipated condition, and to apply the control signal to the device.

* * * * *

UNITED STATES PATENT AND TRADEMARK OFFICE
CERTIFICATE OF CORRECTION

PATENT NO. : 5,995,895
DATED : November 30, 1999
INVENTOR(S) : John D. Watt; Richard E. McMillen; Gerald E. Salzman; Jesse H. Orsborn; Stephen M. Faivre; James G. Morrow; Peter J. Vogel It is certified that error appears in the above-identified patent and that said Letters Patent is hereby corrected as shown below:

In claim 13, column 22, line 21, replace "10" with --12--.

In claim 14, column 22, line 49, insert --,-- after "device".

Signed and Sealed this

Eighteenth Day of July, 2000

Attest:

Q. TODD DICKINSON

*Attesting Officer*   *Director of Patents and Trademarks*